United States Patent
Mandato et al.

(10) Patent No.: US 7,681,203 B2
(45) Date of Patent: Mar. 16, 2010

(54) CONTEXT-AWARE AUTOMATIC SERVICE DISCOVERY AND EXECUTION ENGINE IN MOBILE AD-HOC NETWORKS

(75) Inventors: Davide Mandato, Fellbach (DE); Ernö Kovacs, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1547 days.

(21) Appl. No.: 10/969,760

(22) Filed: Oct. 20, 2004

(65) Prior Publication Data

US 2005/0114493 A1    May 26, 2005

(30) Foreign Application Priority Data

Oct. 22, 2003 (EP) .................................. 03023976

(51) Int. Cl.
  *G06F 9/54* (2006.01)
  *G06F 15/173* (2006.01)
(52) U.S. Cl. ....................... 719/316; 709/223
(58) Field of Classification Search ................ 719/316; 709/204
  See application file for complete search history.

(56) References Cited

U.S. PATENT DOCUMENTS

| | | | | |
|---|---|---|---|---|
| 7,510,113 B2 * | 3/2009 | Igarashi et al. | ............... | 235/379 |
| 2001/0013094 A1 * | 8/2001 | Etoh et al. | ................... | 712/227 |
| 2004/0093381 A1 * | 5/2004 | Hodges et al. | .............. | 709/204 |
| 2005/0219120 A1 * | 10/2005 | Chang | ................... | 342/357.13 |

FOREIGN PATENT DOCUMENTS

| EP | 1 107 512 | 6/2001 |
|---|---|---|
| EP | 1 130 869 | 9/2001 |
| EP | 1 199 860 | 4/2002 |
| EP | 1 298 527 | 4/2003 |

OTHER PUBLICATIONS

Dey A K: "Providing Architectural Support for Building Context-Aware Applications", Nov. 2000, XP002188154.
Dey, Anind K. "Providing Architectural Support for Building Context-Aware Applications: A Thesis Presented to The Academic Faculty." Ph.D. Thesis, College of Computing, Georgia Institute of Technology, Nov. 2000. Available at: http://www.cc.gatech.edu/fce/ctk/pubs/dey-thesis.pdf.

(Continued)

*Primary Examiner*—Hyung S Sough
*Assistant Examiner*—Abdou K Seye
(74) *Attorney, Agent, or Firm*—Oblon, Spivak, McClelland, Maier & Neustadt, L.L.P.

(57) ABSTRACT

In mobile computing and context awareness in mobile ad-hoc networks, node connectivity is unpredictably time-varying. A middleware entity solves the problem of automatically executing a user-defined set of actions, collected in a user profile, upon detection of events such as an attachment of a mobile terminal to the ad-hoc network, changes of the underlying network topology, the moving of mobile terminals into the physical proximity of further mobile terminals, the presence of services and/or of users within the network, and a detachment of a mobile terminal from the ad-hoc network. Thereby, the actions are invocations of services hosted on the mobile terminal or other mobile terminals interconnected via the ad-hoc network. The aforementioned profiles are stored on mobile terminals (e.g. PDAs, mobile phones, etc.) or on fixed or mobile customer-edge devices such as television sets, home gateways, etc. Also envisioned is the deployment of a distributed database holding the profiles.

19 Claims, 32 Drawing Sheets

OTHER PUBLICATIONS

Schilit, Bill N. "Disseminating Active Map Information to Mobile Hosts." IEEE Network vol. 8, No. 5: pp. 22-32. Sep./Oct. 1994. Available at: ftp://ftp.parc.xerox.com/pub/schilit/AMS.ps.Z.

Want, Roy, et al. "The Active Badge Location System." *ACM Transactions on Information Systems* vol. 10, No. 1: pp. 91-102. Jan. 1992.

Brown, Martin G. "Supporting User Mobility." In the *Proceedings of the IFIP Conference on Mobile Communications(IFIP '96)*, Canberra, Australia, IFIP. Sep. 1996.

Cooperstock, Jeremy R., et al. "Evolution of a Reactive Environment." In the *Proceedings of the 1995 ACM Conference on Human Factors in Computing Systems (CHI '95)*, pp. 170-177, Denver, CO, ACM. May 7-11, 1995.

Elrod, Scott, et al. "Responsive Office Environments." *Communications of the ACM* vol. 36, No. 7: pp. 84-85. Jul. 1993.

Hull, Richard, et al. "Towards Situated Computing." In the *Proceedings of the 1st International Symposium on Wearable Computers (ISWC'97)*, pp. 146-153, Cambridge, MA, IEEE. Oct. 13-14, 1997. Available at: http://fog.hpl.external.hp.com/techreports/97/HPL-97-66.pdf.

Rekimoto, Jun, et al. "Augment-able Reality: Situated Communication through Physical and Digital Spaces." In the *Proceedings of the 2nd IEEE International Symposium on Wearable Computers (ISWC'98)*, pp. 68-75, Pittsburgh, PA, IEEE. Oct. 19-20, 1998. Available at: http://www.csl.sony.co.jp/person/rekimoto/papers/iswc98.pdf.

Fickas, Stephen, et al. "Software Organization for Dynamic and Adaptable Wearable Systems." In the *Proceedings of the 1st International Symposium on Wearable Computers (ISWC'97)*, pp. 56-63, Cambridge, MA, IEEE. Oct. 13-14, 1997. Available at: http://www.cs.uoregon.edu/research/wearables/Papers/iswc97.ps.

Pascoe, Jason. "Adding Generic Contextual Capabilities to Wearable Computers." In the Proceedings of the 2nd IEEE International Symposium on Wearable Computers (ISWC'98), pp. 92-99, Pittsburgh, PA, IEEE. Oct. 19-20, 1998. Available at: http://www.cs.ukc.ac.uk/pubs/1998/676/content.zip.

Pascoe, Jason, et al. "Human-Computer-Giraffe Interaction: HCI in the Field." In the *Workshop on Human Computer Interaction with Mobile Devices*, Glasgow, Scotland. May 21-23, 1998. Available at: http://www.dcs.gla.ac.uk/~johnson/papers/mobile/HCIMD1.html#_Toc420818982.

Ryan, Nick, et al. "Enhanced Reality Fieldwork: the Context Aware Archaeological Assistant." Computer Applications and Quantitative Methods in Archaeology. V. Gaffney, M. van Leusen and S. Exxon, Editors. Oxford. Available at: http://www.cs.ukc.ac.uk/research/infosys/mobicomp/Fieldwork/Papers/CAA97/ERFIdwk.html.

Dey, Anind K. "Context-Aware Computing: The CyberDesk Project." In the *Proceedings of the AAAI 1998 Spring Symposium on Intelligent Environments (AAAI Technical Report SS-98-02)*, pp. 51-54, Palo Alto, CA, AAAI Press. Mar. 23-25, 1998. Available at: http://www.cc.gatech.edu/fce/cyberdesk/pubs/AAAI98/AAAI98.html.

Dey, Anind K. "CyberDesk: a framework for providing self-integrating context-aware services." *Knowledge-Based Systems* vol. 11, No. 1: pp. 3-13. Sep. 30, 1998. Available at: http://www.cc.gatech.edu/fce/ctk/pubs/KBS11-1.pdf.

Salber, Daniel, et al. "Designing For Ubiquitous Computing: A Case Study in Context Sensing." Technical Report GIT-GVU-99-29. Georgia Institute of Technology, GVU Center. Atlanta, GA. Available at: ftp://ftp.cc.gatech.edu/pub/gvu/tr/1999/99-29.pdf.

Schilit, Bill N., et al. "Context-Aware Computing Applications." In the *Proceedings of the 1st International Workshop on Mobile Computing Systems and Applications*, pp. 85-90, Santa Cruz, CA, IEEE. Dec. 8-9, 1994.

Brown, Peter J., et al. "Context-Aware Applications: From the Laboratory to the Marketplace." *IEEE Personal Communications* vol. 4, No. 5: pp. 58-64. Oct. 1997. Available at: http://www.cs.ukc.ac.uk/people/staff/pjb/papers/personal_comms.html.

Dey, Anind K., and Abowd, Gregory D.: "CyberDesk: The Use of Perception in Context-Aware Computing." In the *Proceedings of the 1997 Workshop on Perceptual User Interfaces (PUI '97)*, pp. 26-27, Banff, Alberta. Oct. 19-21, 1997. Available at: http://www.cc.gatech.edu/fce/cyberdesk/pubs/PUI97/pui.html.

Ward, Andy, et al. "A New Location Technique for the Active Office." *IEEE Personal Communications* vol. 4, No. 5: pp. 42-47. Oct. 1997.

Abowd, Gregory D., et al. "Context-awareness in wearable and ubiquitous computing." *Virtual Reality* vol. 3: pp. 200-211. 1998.

Davies, Nigel, et al. "Developing a Context Sensitive Tourist Guide." In the 1st *Workshop on Human Computer Interaction for Mobile Devices*, Glasgow, Scotland. May 21-23, 1998. Available at: http://www.dcs.gla.ac.uk/~johnson/papers/mobile/HCIMD1.html#_TOC420818986.

Kortuem, Gerd, et al. "Context-Aware, Adaptive Wearable Computers as Remote Interfaces to 'Intelligent' Environments." In the *Proceedings of the 2nd IEEE International Symposium on Wearable Computers (ISWC '98)*, pp. 58-65, Pittsburgh, PA, IEEE. Oct. 19-20, 1998. Available at: http://www.cs.uoregon.edu/research/wearables/Papers/ISWC98-kortuem.ps.

Ryan, Nick: "MCFE Metadata Elements Version 0.2. Working Document." University of Kent at Canterbury. Kent, United Kingdom. Available at: http://www.cs.ukc.ac.uk/research/infosys/mobicomp/Fieldwork/Notes/mcfemeta.html.

Brown, Peter J. "Triggering information by context." *Personal Technologies* vol. 2, No. 1: pp. 1-9. Mar. 1998. Available at: http://www.cs.ukc.ac.uk/people/staff/pjb/papers/personal_technologies.htm.

* cited by examiner

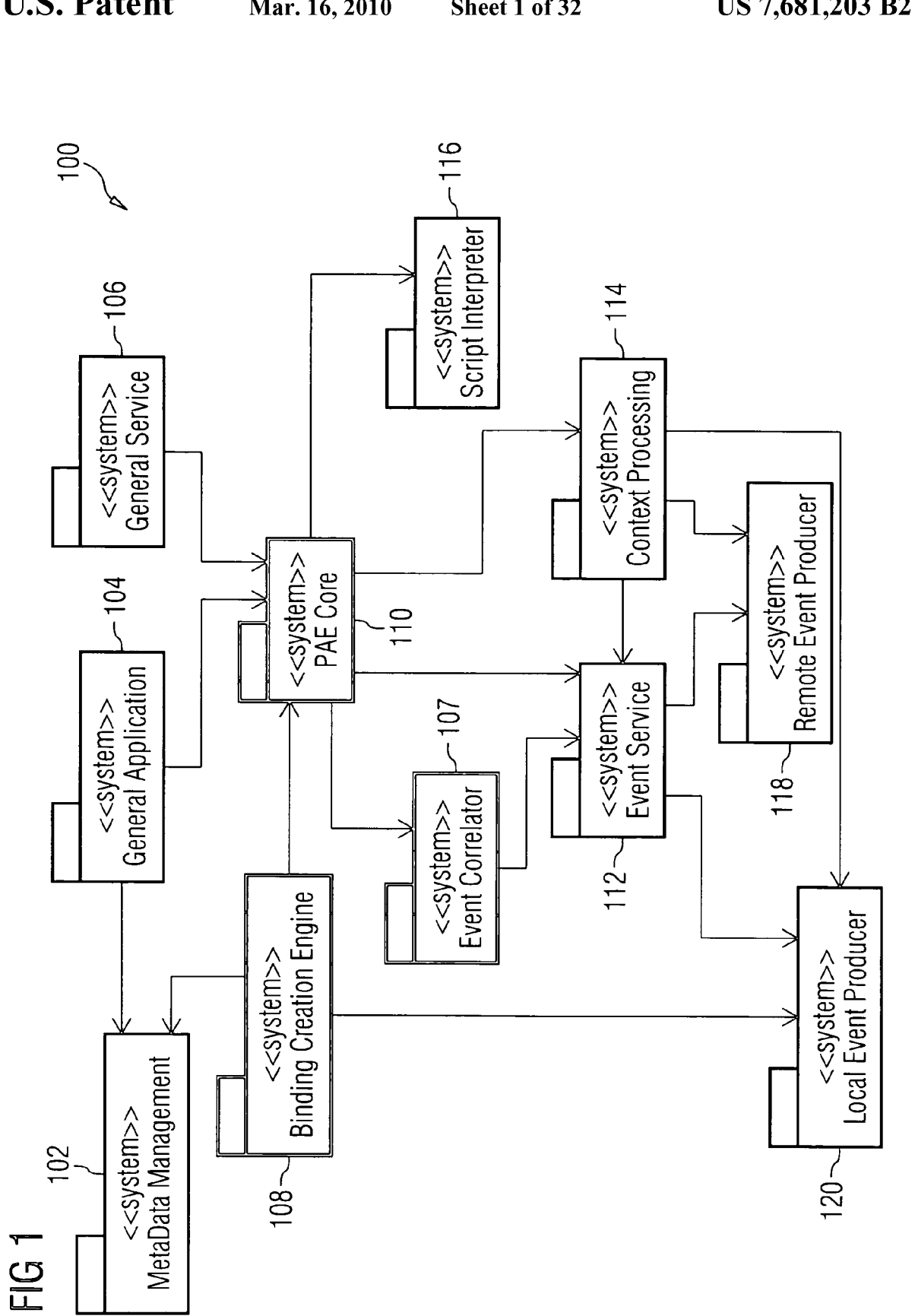

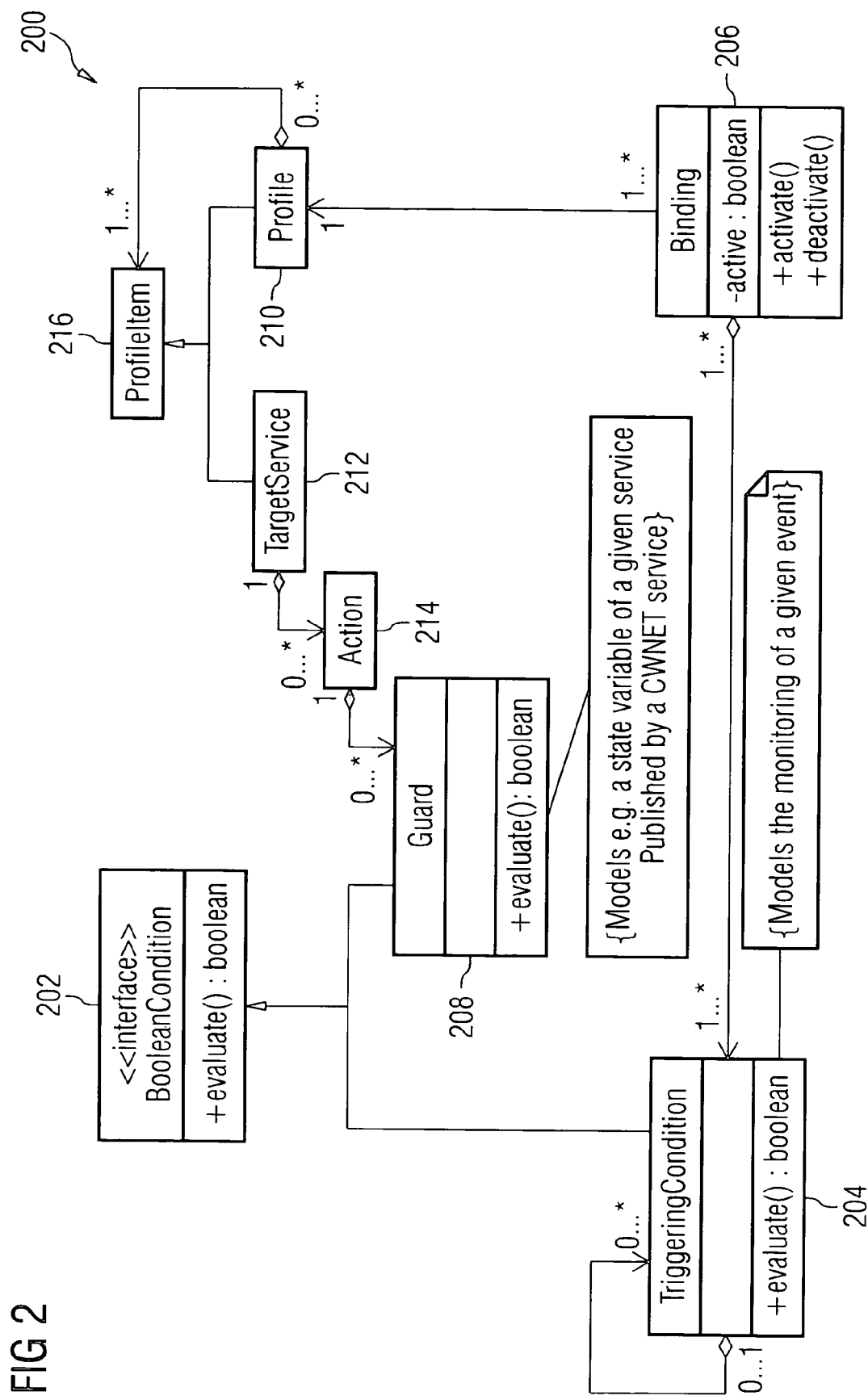

FIG 4

```
<Binding b-id="b1">
   <state active="true"/>
   <TriggeringCondition tc-id="tc1">
      <TriggerType="detectNetwork"/>
   </TriggeringCondition>
   <TriggeringCondition tc-id="tc2">
      <TriggerType="detectService"/>
      <TriggerValue="IMS"/>
   </TriggeringCondition>
   <TriggeringCondition tc-id="tc3">
      <TriggerType="@TriggeringCondition="tc1" OR tc2"/>
   </TriggeringCondition>
   <Profile>
      <on-tc ref="tc3" result="eventSubType">
        <TargetService name="local/APS">
           <alt value="onFound"
              Action="doSynchronization(int imageNmb = 065)"/>
           <alt default="true" value="onLost"
              Action="doIndicateOfflineStateToUser(String err =
"Automatic.Photo\
              Synchronization interrupted: IMS no longer available")"/>
        </TargetService>
   </Profile>
```

400

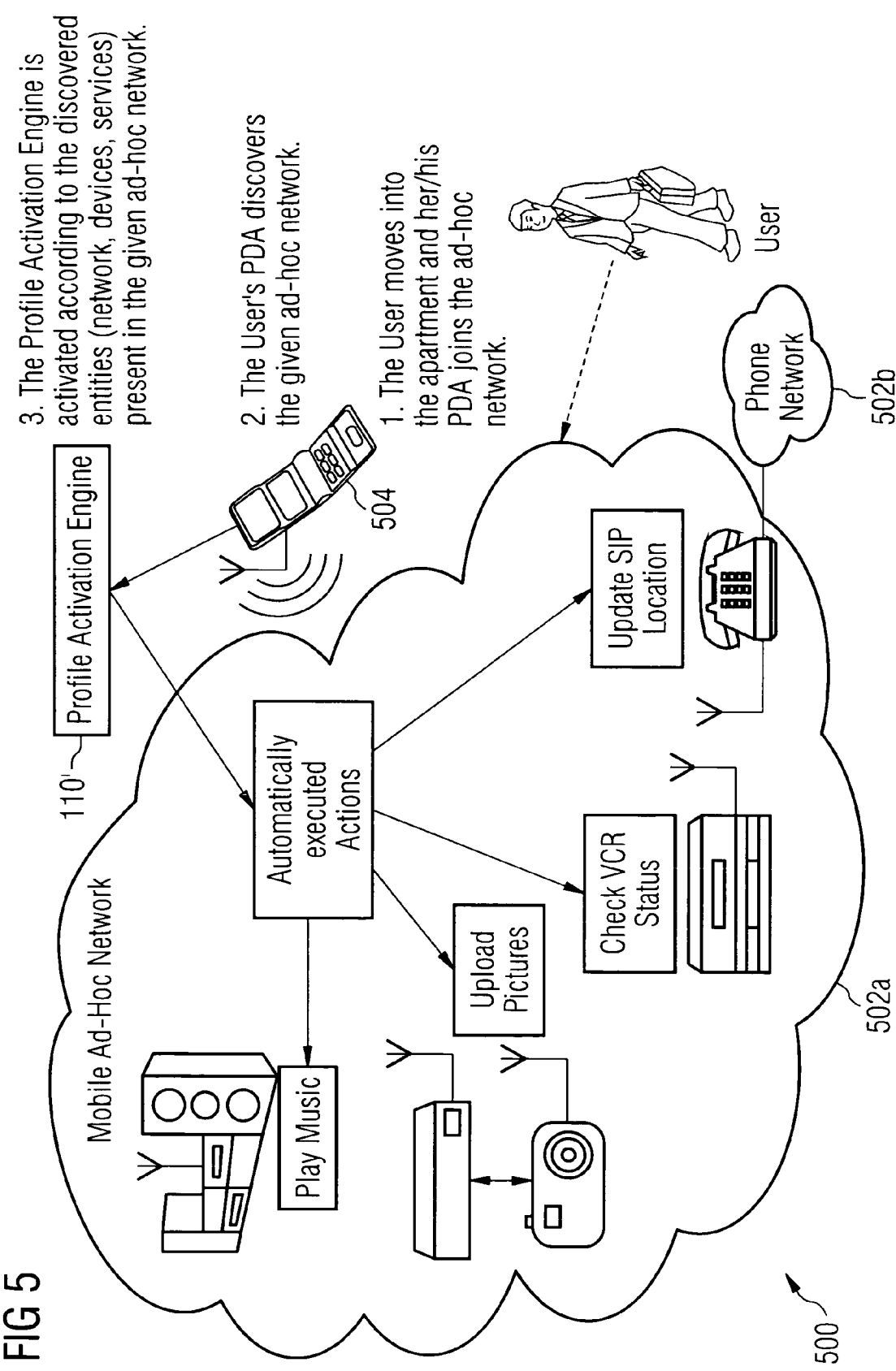

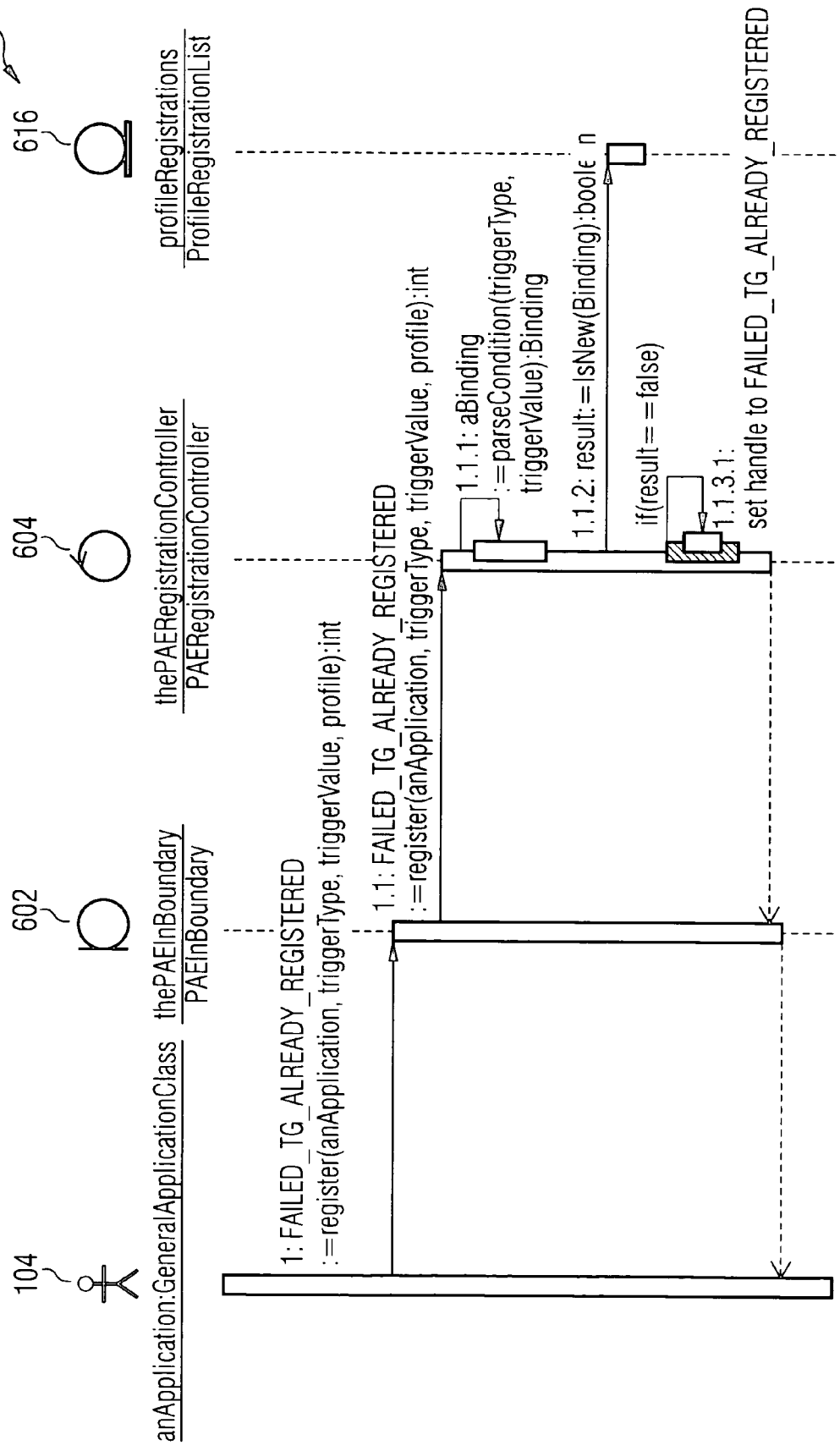

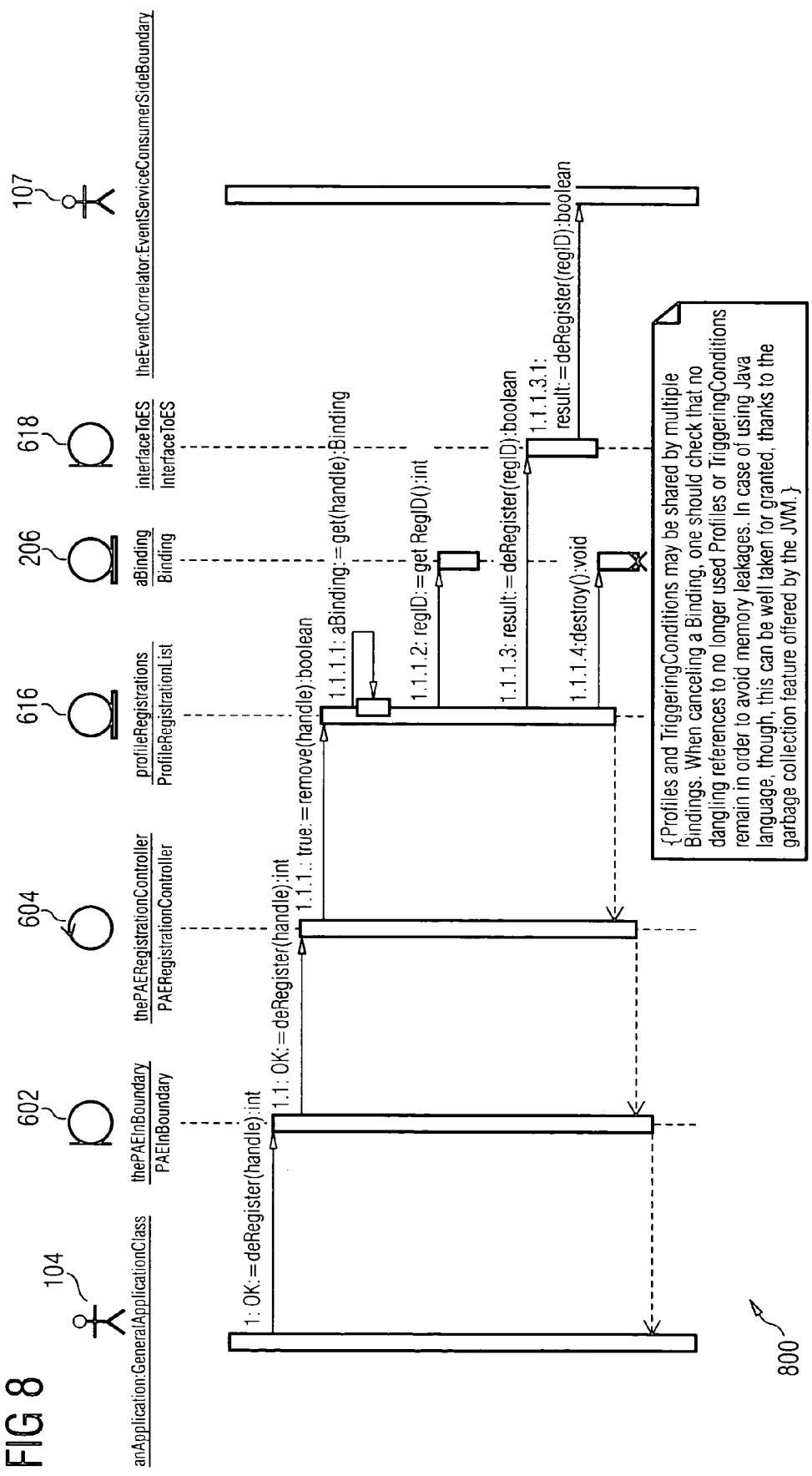

Interface:BooleanCondition
package:SystemArchitecture.Middleware.ProfileActivationEngine
All Known Implementing Classes:
    Guard, TriggeringCondition

| Method Summary | |
|---|---|
| public boolean | evaluate() |

Class: InterfaceToES
package: SystemArchitecture.Middleware.ProfileActivationEngine
    public class InterfaceToES
Implements:
    SystemArchitecture.Middleware.EventService.EventCorrelationConsumer,
    SystemArchitecture.Middleware.EventService.EventConsumerSupport
Stereotype:boundary

| Method Summary | |
|---|---|
| protected boolean | deRegister(int p0) |
| public void | receiveEvent(Event p0) |
| public int | register(EventConsumer p0, int p1) |
| protected ReturnValue | register(EventConsumer p0, int p1, long p2) |
| public void | registerAsConsumerCfm(int p0, int p1) |
| public void | registerAsConsumerCfm(int p0, int p1, long p2) |
| protected int | registerAsConsumerReq(int p0, int p1, Object p2, EventPrducer p3) |
| public void | registerAsConsumerReq(int p0, EventConsumer p1, int p2, Object p3, long p4, listOfProducer [] p5) |
| public void | registerAsConsumerReq(int p0, EventConsumer p1, int p2, Object p3, EventProcedur p4) |
| protected long | reRegister(int p0, long p1) |

Class: PAEInBoundary
package: SystemArchitecture.Middleware.ProfileActivationEngine
    public class PAEInBoundary
Stereotype:boundary

| Method Summary | |
|---|---|
| public int | activate(int p0) |
| public int | deActivate(int p0) |
| public int | deRegister(int p0) |
| public int | register(GeneralService p0, String p1, String p2, String p3) |

Class: PAEOutBoundary
package: SystemArchitecture.Middleware.ProfileActivationEngine
    public class PAEOutBoundary
Stereotype:boundary

| Method Summary | |
|---|---|
| public void | invoke(Action p0) |

Class: PAECore
package: SystemArchitecture.Middleware.ProfileActivationEngine
    public class PAECore
Stereotype:control

| Method Summary | |
|---|---|
| public void | fire(Event p0) |

Class: PAERegistrationController
package: SystemArchitecture.Middleware.ProfileActivationEngine
public class PAERegistrationController

| Method Summary | |
|---|---|
| public int | activate(int p0) |
| public int | CreateHandle() |
| public int | deActivate(int p0) |
| public int | deRegister(int p0) |
| public boolean | findMatch(Token p0, Token p1) |
| public Token | getNextAction(String p0) |
| public Token | getNextTargetService(String p0) |
| public EventProducer | getSource(triggerTypeToken p0) |
| public Token | nextToken(String p0) |
| public Binding | parseCondition(String p0, String p1) |
| public Profile | parseProfile(String p0) |
| public int | register(GeneralService p0, String p1, String p2, String p3) |

Class: TargetService
package: SystemArchitecture.Middleware.ProfileActivationEngine
SystemArchitecture.Middleware.ProfileActivationEngine.ProfileItem
⋮
SystemArchitecture.Middleware.ProfileActivationEngine.TargetService
    public class TargetService
Stereotype:entity

| Method Summary | |
| --- | --- |
| public void | add(Action p0) |
| public TargetService | create(Token p0) |
| public void | execute(Event p0) |
| public String | getID() |
| public Action | getNextAction() |
| public boolean | hasActions() |

Class: ProfileRegistrationList
package: SystemArchitecture.Middleware.ProfileActivationEngine
    public class ProfileRegistrationList
Stereotype:entity
persistent

| Method Summary | |
|---|---|
| public void | associate(int p0, int p1) |
| public Binding | get(int p0) |
| public Binding | getNextBinding(Event p0) |
| public boolean | hasBinding(Event p0) |
| public boolean | isNew(Binding p0) |
| public int | register(Binding p0) |
| public boolean | remove(int p0) |

Class: ProfileItem
package: SystemArchitecture.Middleware.ProfileActivationEngine
    public class ProfileItem
Stereotype:entity

| Method Summary | |
|---|---|
| public abstract void | execute(Event p0) |

Class: Profile
package: SystemArchitecture.Middleware.ProfileActivationEngine
SystemArchitecture.Middleware.ProfileActivationEndgine.ProfileItem
⋮
SystemArchitecture.Middleware.ProfileActivationEngine.Profile
        public class Profile
Stereotype:entity

| Method Summary | |
| --- | --- |
| public void | add(Action p0) |
| public void | execute(Event p0) |
| public Service | getNextTargetService() |
| public boolean | hasTargetServices() |

Class: Guard
package: SystemArchitecture.Middleware.ProfileActivationEngine
      public class Guard
Implements:
      SystemArchitecture.Middleware.ProfileActivationEngine.BooleanConditio
n

| Method Summary | |
| --- | --- |
| public boolean | evaluate() |

Class: TriggeringCondition
package: SystemArchitecture.Middleware.ProfileActivationEngine
    public class TriggeringCondition
Implements:
    SystemArchitecture.Middleware.ProfileActivationEngine.BooleanCondition
Stereotype:entity

| Method Summary ||
|---|---|
| public TriggeringCondition | create(Token p0, Token p1) |
| public boolean | evaluate() |
| public EventProducer | getSource() |
| public Object | getTriggeringCondition() |
| public void | setSource(Event Producer source) |
| public void | setTriggeringCondition(Object triggeringCondition) |

Class: Action
package: SystemArchitecture.Middleware.ProfileActivationEngine
    public class Action
Stereotype:entity

| Method Summary ||
|---|---|
| public Action | create(Token p0) |
| public void | execute(Targetservicce p0, Event p1) |

Class: Binding
package: SystemArchitecture.Middleware.ProfileActivationEngine
    public class Binding
Stereotype:entity

| Method Summary | |
|---|---|
| public void | add(TriggerCondition p0) |
| public Binding | create(TriggeringCondition p0, Profile p1) |
| public void | destroy() |
| public int | getEventType() |
| public Profile | getProfile() |
| public int | getRegID() |
| public EventProducer[] | getSources() |
| public Object | getTriggeringConditions() |
| public boolean | isActive() |
| public void | setActive(boolean active) |
| public void | setEventType(int eventType) |
| public void | setProfile(Profile p0) |
| public void | setRegID(int regID) |

FIG 35
3500

Class: TargetServiceThread
package: SystemArchitecture.Middleware.ProfileActivationEngine
    public class TargetServiceThread

FIG 36
3600

Class:CorePAEThread
package: SystemArchitecture.Middleware.ProfileActivationEngine
    public class CorePAEThread

FIG 37
3700

Class:GeneralApplicationThread
package: SystemArchitecture.Middleware.ProfileActivationEngine
    public class GeneralApplicationThread

FIG 38
3800

Class:PAERegistrationThread
package: SystemArchitecture.Middleware.ProfileActivationEngine
    public class PAERegistrationThread

CONTEXT-AWARE AUTOMATIC SERVICE DISCOVERY AND EXECUTION ENGINE IN MOBILE AD-HOC NETWORKS

FIELD AND BACKGROUND OF THE INVENTION

The invention generally relates to the field of mobile computing and context awareness in wireless ad-hoc networks where the quality of the node connectivity can be unpredictably time-varying. It particularly refers to a specially designed middleware entity that solves the problem of automatically executing a user-defined set of actions for requesting, activating, controlling and/or deactivating discovered services offered by nodes of any network upon detection of the occurrence of specific triggering conditions.

BRIEF DESCRIPTION OF THE PRESENT STATE OF THE ART

Context-aware computing was first discussed in "Disseminating Active Map Information to Mobile Hosts" (IEEE Network 8 (5), pp. 22-32, September/October 1994, available at: ftp://ftp.parc.xerox.com/pub/schilit/AMS.ps.Z) by B. N. Schilit and M. M. Theimer. Therein, it is defined as software that "adapts according to its location of use, the collection of nearby people and objects as well as changes to those objects over time". However, it is commonly agreed that the first research investigation of context-aware computing was the Olivetti Active Badge work in 1992 as described in the article "The Active Badge Location System" (ACM Transactions on Information Systems 10 (1), pp. 91-102, January 1992, available at: http://www.parc.xerox.com/csl/members/want/papers/ab-tois-jan92.pdf) by R. Want, A. Hopper, V. Falcao, and J. Gibbons. Since then, there have been numerous attempts to define context-aware computing.

The first definition of context-aware applications given in the aforementioned article "Disseminating Active Map Information to Mobile Hosts" by B. N. Schilit and M. M. Theimer restricted the definition from applications that are simply informed about context to applications that adapt themselves to context. Context-aware has become somewhat synonymous with other terms:

adaptive—see M. G. Brown: "Supporting User Mobility" (Proc. of the IFIP Conference on Mobile Communications (IFIP '96), Canberra, Australia, September 1996, available at: ftp://ftp.uk.research.att.com/pub/docs/att/paper.96.7.pdf), reactive—see J. R. Cooperstock, K. Tanikoshi, G. Beirne, T. Narine, and W. Buxton: "Evolution of a Reactive Environment" (Proc. of the 1995 ACM Conference on Human Factors in Computing Systems (CHI '95), pp. 170-177, Denver, Colo., May 7-11, 1995, http://www1.acm.org/sigs/sigchi/chi95/Electronic/documnts/papers/jrc_bdy.htm), responsive—see S. Elrod, G. Hall, R. Constanza, M. Dixon, and J. des Rivieres: "Responsive Office Environments" (Comm. of the ACM 36 (7), pp. 84-85, July 1993, available at: http://www.acm.org/pubs/articles/journals/cacm/1993-36-7/p84-elrod/p84-elrod.pdf), situated—see R. Hull, Ph. Neaves, and J. Bedford-Roberts: "Towards Situated Computing" (Proc. of the $1^{st}$ International Symposium on Wearable Computers (ISEC '97), pp. 146-153, Cambridge, Mass., IEEE, Oct. 13-14, 1997, available at: http://fog.hpl.external.hp.com/techreports/97/HPL-97-66.pdf), context-sensitive—see J. Rekimoto, Y. Ayatsuka, and K. Hayashi: "Augmentable Reality: Situated Communication through Physical and Digital Spaces" (Proc. of the $2^{nd}$ IEEE International Symposium on Wearable Computers (ISWC '98), pp. 68-75, Pittsburgh, Pa., IEEE, Oct. 19-20, 1998, available at: http://www.csl.sony.cojp/person/rekimoto/papers/iswc98.pdf), and environment-directed—see S. Fickas, G. Kortuem, and Z. Segall: "Software Organization for Dynamic and Adaptable Wearable Systems" (Proc. of the $1^{st}$ International Symposium on Wearable Computers (ISWC '97), pp. 56-63, Cambridge, Mass., IEEE, Oct. 13-14, 1997, available at: http://www.cs.uoregon.edu/research/wearables/Papers/iswc97.ps).

Previous definitions of context-aware computing fall into two categories: using context and adapting to context.

First, the more general case of using context shall be discussed. In the articles "Towards Situated Computing" (Proc. of the $1^{st}$ International Symposium on Wearable Computers (ISEC '97), pp. 146-153, Cambridge, Mass., IEEE, Oct. 13-14, 1997, available at: http://fog.hpl.external.hp.com/techreports/97/HPL-97-66.pdf) by R. Hull, Ph. Neaves, and J. Bedford-Roberts, "Adding Generic Contextual Capabilities to Wearable Computers" (Proc. of the $2^{nd}$ IEEE International Symposium on Wearable Computers (ISWC '98), pp. 92-99, Pittsburgh, Pa., IEEE, Oct. 19-20, 1998, available at: http://www.cs.ukc.ac.uk/pubs/1998/676/content.zip) by J. Pascoe, "Human-Computer-Giraffe Interaction —HCl in the Field" (Workshop on Human Computer Interaction with Mobile Devices, Glasgow, Scotland, May 21-23, 1998, available at: http://www.dcs.gla.ac.uk/~johnson/papers/mobile/HCIMDI.html#_Toc420818982) by J. Pascoe, N. S. Ryan, and D. R. Morse, and "Enhanced Reality Fieldwork: The Context-Aware Archaeological Assistant" (Computer Applications and Quantitative Methods in Archaeology, V. Gaffney, M. van Leusen, S. Exxon (editors), Oxford, available at: http://www.cs.ukc.ac.uk/research/infosys/mobicomp/Fieldwork/Papers/CAA97/ERFldwk.html) by N. S. Ryan, J. Pascoe, and D. Morse context-aware computing is defined to be the ability of computing devices to detect and sense, interpret and respond to aspects of a user's local environment and the computing devices themselves. In previous works—cf. A. K. Dey: "Context-Aware Computing: The CyberDesk Project" (Proc. of the AAAI 1998 Spring Symposium on Intelligent Environments (AAAI Technical Report SS-98-02), pp. 51-54, Palo Alto, Calif., AAAI Press. Mar. 23-25, 1998, available at: http://www.cc.gatech.edu/fce/cyberdesk/pubs/AAAI98/AAAI98.html), A. K. Dey, G. D. Abowd, and A. Wood: "CyberDesk: A Framework for Providing Self-Integrating Context-Aware Services" (Knowledge-Based Systems 11 (1), pp. 3-13, Sep. 30, 1998, available at: http://www.cc.gatech.edu/fce/ctk/pubs/KBS11-1.pdf), and D. Salber, A. K. Dey, R. J. Orr, and G. D. Abowd: "Designing for Ubiquitous Computing: A Case Study in Context Sensing" (Technical Report GIT-GVU-99-29, Georgia Inst. of Technology, GVU Center, Atlanta, Ga., ftp://ftp.c-c.gatech.edu/pub/gvu/tr/1999/99-29.pdf)-, context awareness has been defined as the use of context to automate a software system, to modify an interface and to provide maximum flexibility of a computational service.

The following definitions are in the sense of the more specific "adapting-to-context" category. As described in the articles "Context-Aware Computing Applications" (Proc. of the $1^{st}$ International Workshop on Mobile Computing Systems and Applications, pp. 85-90, Santa Cruz, Calif., IEEE, Dec. 8-9, 1994, available at: ftp://ftp.parc.xerox.com/pub/schilit/wmc-94.schilit.ps) by B. N. Schilit, N. I. Adams, and R. Want, "Context-Aware Applications: From the Laboratory to the Marketplace" (IEEE Personal Communications 4 (5), pp. 58-64, October 1997, available at: http://www.cs.ukc.ac.uk/people/staff/pjb/papers/personal_comms.html) by P. J. Brown, J. D. Bovey, and X. Chen, "CyberDesk: The Use of Perception in Context-Aware Computing" (Proc. of the 1997 Workshop on Perceptual User Interfaces (PUI '97), pp. 26-27, Banff, Alberta, Oct. 19-21, 1997, http://www.cc.gatech.edu/fce/cyberdesk/pubs/PUI97/pui.html) by A. K. Dey and G. D. Abowd, "A New Location Technique for the Active Office" (IEEE Personal Communications 4 (5), pp. 42-47, October 1997, http://www.it.kth.se/edu/Ph.D/Location-Aware/ftp.orl.co.uk:/pub/docs/ORL/tr.97.10.pdf) by A. Ward, A. Jones, and A. Hopper, "Context-Awareness in Wearable and Ubiquitous Computing" (Virtual Reality 3, pp. 200-211, 1998, available at: http://www.cc.gatech.edu/fce/ctk/pubs/VRSIJ-3.pdf) by G. D. Abowd, A. K. Dey, R. J. Orr, and J. Brotherton, "Developing a Context-Sensitive Tour Guide" ($1^{st}$ Workshop on Human Computer Interaction for Mobile Devices, Glasgow, Scotland, May 21-23, 1998, available at: http://www.dcs.gla.ac.uk/~johnson/papers/mobile/HCIMD1.html#Toc420818986) by N. Davies, K. Mitchell, K. Cheverst, and G. Blair, and "Context-Aware, Adaptive Wearable Computers as Remote Interfaces to 'Intelligent' Environments" (Proc. of the $2^{nd}$ International Symposium on Wearable Computers (ISWC '98), pp. 58-65, Pittsburgh, Pa., IEEE, Oct. 19-20, 1998, http://www.cs.uoregon.edu/research/wearables/Papers/ISWC98-kortuem.ps) by G. Kortuem, Z. Segall, and M. Bauer, context-aware applications are defined as applications that dynamically change or adapt their behavior based on the context of the application and the user. More specifically, in his article "MCFE Metadata Elements, Version 0.2. Working Document" (University of Kent at Canterbury, Kent, UK, available at: http://www.cs.ukc.ac.uk/research/infosys/mobicomp/Fieldwork/Notes/mcfemeta.html) the author N. Ryan defines them as applications that monitor input from environmental sensors and allow users to select from a range of physical and logical contexts according to their current interests or activities. This definition is more restrictive than the previous definition by identifying the method in which applications act upon context. In the article "Triggering Information by Context" (Personal Technologies 2 (1), pp. 1-9, March 1998, available at: http://www.cs.ukc.ac.uk/people/staff/pjb/papers/personal_technologies.htm) by P. J. Brown the author defines context-aware applications as applications which automatically provide information and/or take actions according to a user's present context as detected by a number of sensors. He also takes a narrow view of context-aware computing by stating that these actions can take the form of presenting information to the user, executing a program according to context or configuring a graphical layout according to the context. In their article "Software Organization for Dynamic and Adaptable Wearable Systems" (Proc. of the $1^{st}$ International symposium on Wearable Computers (ISWC '97), pp. 56-63, Cambridge, Mass., IEEE, Oct. 13-14, 1997, http://www.cs.uoregon.edu/research/wearables/Papers/iswc97.ps) the authors S. Fickas, G. Kortuem, and Z. Segall define environment-directed (as a practical synonym for context-aware) applications as applications which monitor changes in a user's environment and adapt their operation according to predefined user-defined guidelines.

In EP 1 107 512 A1 a communication device and a software for operating multimedia applications in at least one communication network is described which comprises a computing manager unit for managing and providing multimedia applications on the basis of a communication with one or more communication devices in the at least one communication network.

EP 1 130 869 A1 generally relates to the field of mobile multimedia middleware, computer networking, distributed processing systems, databases, hand-held computers and wireless communication systems. Moreover, a method for conveniently managing user profile information in a unified instant messaging system is proposed.

As described in EP 1 199 860 A1, a service portal is used which enables services to access to context information stored in a context database by accessing a central access control unit of the service platform.

EP 1 298 527 A1 provides a system for supplying context information on request to context-aware devices comprising context attributes specifying a type, a format, and a focus entity for a data record representing the response to the request for context information, at least one context source providing context data relevant for the request of context information, at least one context interpreter for establishing an interconnection between the context attribute and the context source, and a configuration means for setting up a dynamic context graph configuration for assembling context sources and context interpreters based on their actual availability and suitability to provide the data record.

Shortcomings and Problems of Prior-Art Solutions

The problems addressed by the present invention refer to the issues of how to specify userdefined sets of actions (collected in so-called user profiles) and bind them to specific triggering conditions, how to detect when and under which circumstances the actions of a given user profile shall automatically be executed on behalf of the respective user and how to automatically execute said actions. Moreover, the invention is addressed to the problem of identifying middleware components providing the developers of software applications (and/or of other middleware components) for mobile terminals that are interconnected via wired or wireless ad-hoc networks with sets of specific application programming interfaces (APIs) specialized in addressing the aforementioned three issues. In this way, the developers of software applications (and/or of other middleware components) for said mobile terminals can leverage the functionality of said middleware components instead of re-implementing the same functionality for each software application (and/or of other middleware components).

OBJECT OF THE PRESENT INVENTION

In view of the explanations mentioned above, it is the object of the invention to propose a QoS metric probing mechanism which supports context-aware service discovery and automatic execution of a set of actions offered by services which have automatically been discovered within mobile ad-hoc networks. The triggering conditions should be specified in terms of a detection of specific classes of events (and, eventually, given combinations thereof) such as attachments of a mobile terminals to a wired or wireless ad-hoc network, changes of the underlying network topology, the moving of mobile terminals into the physical proximity of further mobile terminals, presence awareness, which means recognizing the appearance and disappearance of users within said network, and detachments of the mobile terminals from the network.

The specification of each action contained in a given user profile should optionally include certain qualifiers (thereinafter called the "guard conditions" or simply the "guards"), which are additional low-level conditions that should be met before executing the given action.

This object is achieved by means of the features of the independent claims. Advantageous features are defined in the dependent claims. Further objects and advantages of the invention are apparent in the detailed description which follows.

SUMMARY OF THE INVENTION

The present invention is dedicated to a middleware entity of a mobile terminal connected to a wireless ad-hoc network which supports a multiplicity of applications and/or other middleware entities to automatically discover services offered by nodes of said ad-hoc network and execute a user-defined set of actions collected in a profile upon reception of event notification messages indicating the availability of specific services hosted on said mobile terminal or other mobile terminals interconnected via said wireless ad-hoc network whenever a number of predefined triggering conditions for triggering the execution of an action that is used to request, activate, control and/or deactivate these services is met on behalf of said applications and/or the other middleware entities. Such an event can e.g. be an attachment of a mobile terminal to the ad-hoc network, changes of the underlying network topology, the moving of mobile terminals into the physical proximity of further mobile terminals, the presence of users within said network or the detachment of a mobile terminal from the ad-hoc network, time-based events (e.g. a calendar item being notified upon occurrence), and any combinations of the aforementioned types of events. Said actions are invocations of services hosted on said mobile terminal or on other mobile terminals interconnected via said ad-hoc network. The user profiles are stored on mobile terminals (e.g. PDAs, mobile phones, etc.), fixed or mobile customer-edge (CE) devices such as television sets, home gateways, etc. Also envisioned is the deployment of a distributed database holding said user profiles.

The invention thereby outlines the concept of the Profile Activation Engine (PAE), a middleware entity that is provided to enable users specifying a list of operations—offered by services located in the given network—which must automatically be executed whenever certain however complex triggering conditions are met. The monitoring of the aforementioned triggering conditions thereby leverages asynchronous notifications of specific events from various event producers.

BRIEF DESCRIPTION OF THE DRAWINGS

Further advantages and embodiments of the present invention result from the subordinate claims as well as from the following detailed description of the invention as depicted in the accompanying drawings:

FIG. 2 is a UML class diagram showing a structural overview of the data model for the PAE concept according to the present invention, FIG. 4 is a pseudo XML document snippet showing an example of a binding definition according to one embodiment of the present invention, FIG. 5 shows a user scenario wherein the PAE is advantageously used for automatically executing actions of behalf of a user who enters his/her apartment and discovers that local services (e.g. an automatic photo synchronization application which is used for updating a photo database) present in a given mobile ad-hoc network can automatically be executed based on his/her preferences, FIG. 7 is a UML sequence diagram showing the interactions between a general application entity and three middleware entities that are part of one embodiment of this invention in the error case of trying to register a profile for an already registered triggering condition, FIG. 8 is a UML sequence diagram showing the interactions between a general application entity and five middleware entities that are part of one embodiment of this invention in case of a successful binding deregistration for the base flow, FIG. 21 is a table listing the only method of the PAE's public interface BooleanCondition, FIG. 22 is a table listing the methods of the PAE's public class InterfaceToES, FIG. 23 is a table listing the methods of the PAE's public class PAEInBoundary, FIG. 24 is a table listing the only method of the PAE's public class PAEOutBoundary, FIG. 25 is a table listing the only method of the PAE's public class PAECore, FIG. 26 is a table listing the methods of the PAE's public class PAERegistration-cntroller, FIG. 27 is a table listing the methods of the PAE's public class TargetService, FIG. 28 is a table listing the methods of the PAE's public class ProfileRegistrationList, FIG. 29 is a table listing the only method of the PAE's public class ProfileItem, FIG. 30 is a table listing the methods of the PAE's public class Profile, FIG. 31 is a table listing the only method of the PAE's public class Guard, FIG. 32 is a table listing the methods of the PAE's public class TriggeringCondition, FIG. 33 is a table listing the methods of the PAE's public class Action, FIG. 34 is a table listing the methods of the PAE's public class Binding, FIG. 35 is a table listing the methods of the PAE's public class TargetServiceThread, FIG. 36 is a table listing the methods of the PAE's public class CorePAEThread, FIG. 37 is a table listing the methods of the PAE's public class GeneralApplicationThread, and FIG. 38 is a table listing the methods of the PAE's public class PAERegistrationThread.

DETAILED DESCRIPTION OF THE PRESENT INVENTION

Figure 1A:
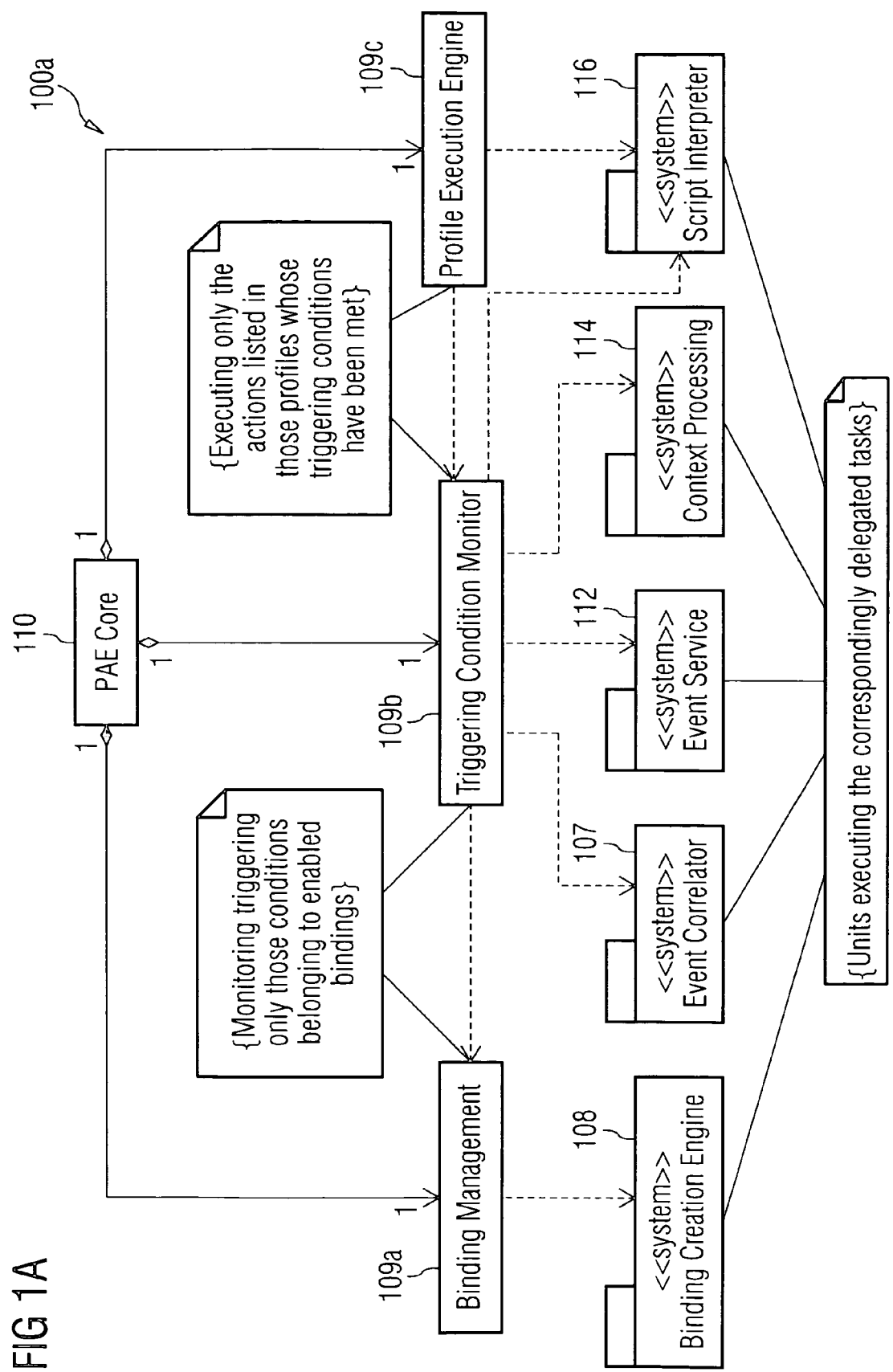
FIG. 1 is a UML object diagram showing the interdependencies between the packages the Profile Activation Engine (PAE) architecture according to the present invention is composed of, FIG. 1a is a UML object diagram showing a more detailed view of the packages the PAE Core is composed of and the interdependencies between these packages.

In the following, embodiments of the present invention as depicted in FIGS. 1 to 5 shall be explained in detail. The meaning of all the symbols designated with reference numerals and signs in FIGS. 1 to 38 can be taken from Table 3.

FIG. 1 shows a UML class diagram 100 which illustrates the outline of the proposed PAE system architecture. Thereby, package icons, stereotyped as systems, represent the applied computing units 102 to 120, and dashed arrows represent the dependencies among these computing units. A computing unit from which a dependency arrow originates thereby depends on the services of the computing unit which is the target of said arrow.

According to the invention, the Profile Activation Engine 110' is a middleware entity that is composed of the following middleware components:

the Binding Creation Engine 108, that allows users to create bindings in a user-friendly way by assisting users to create and/or select triggering conditions, create and/or select user profiles and associate them, the PAE Core 110, which is the entity that handles the actual profile activation upon reception of event notifications indicating any met triggering conditions. This entity also allows PAE-aware applications to directly install a binding by using a PAE well-defined API. A more detailed view of the packages the PAE Core 110 is composed of as well as the interdependencies between said packages is depicted in FIG. 1a. These packages include a Binding Management unit 109a, which manages (S2a) the activation of bindings 206 between triggering conditions 204 and profiles 210 by leveraging (S2a') the services of said Binding Creation Engine 108 or by allowing (S2a") applications to directly install said bindings 206 by using a specified application programming interface (API), a Triggering Condition Monitor 109b for monitoring (S2b) the occurrence of triggering conditions 204 for triggering the execution of actions 214 that are used to request, activate, control and/or deactivate automatically discovered services offered by interconnected nodes of a network 502a and evaluating (S2c) guard conditions for fine-grained control, wherein said triggering conditions 204 belong to active bindings 206, and a Profile Execution Engine 109c for executing (S2d) said actions 214 upon reception of event notification messages indicating any met triggering conditions 204.

The PAE Core 110 depends on the following middleware entities, which are a part of the PAE 110' according to one embodiment of this invention—the Event Service system 112, the Context Processing system 114, and the Script Interpreter system 116 (an optional add-on feature of the PAE Core 110) as shown in FIG. 1.

The Event Service system 112 especially supports the PAE 110' evaluating complex triggering conditions (modeled as events whose notifications the PAE 110' registers for). This middleware entity acts as a mediator between the set of all the event producers (i.e. the target services and/or middleware entities generating event notification messages whenever certain conditions are met) and the set of all the event consumers (i.e. the target services and/or middleware entities interested in receiving specific classes of event notification messages). The Event Service system 112 particularly takes care of the following actions:

a) Abstracting the event producers: The Event Service system 112 allows event consumers to register for classes of events rather than for specific events generated by a given event producer. However, the Event Service system 112 also allows event consumers to register for specific events generated by given event producers.

b) Abstracting distribution aspects: The Event Service system 112 may render the event consumers agnostic about the actual location of the event producers, thanks to the feature described under point a). The use of well-established technologies for handling remote events (e.g. GENA) is envisioned for one embodiment of this invention.

c) Filtering event notification messages: The Event Service system 112 forwards event notification messages only to registered event consumers who are interested in the given class of events and/or event notification messages generated by specific event producers.

d) Correlating events: This is the key feature of the Event Service system 112 that is essential for the PAE 110'. The Event Service system 112 allows event consumers to register for complex classes of events, whereby elemental events generated by a multiplicity or the same event producer(s) are correlated and a notification message is sent to the PAE Core 110 only when such correlation occurs within a specified time interval. To this extent, the Event Service system 112 features a general-purpose middleware subunit called Event Correlator 107, which monitors the occurrence of any type of complex events according to proper specifications thereof passed by interested event consumers to the Event Service system 112 at registration time.

e) Preprocessing the given event notification messages before delivery to the proper event consumers: As a form of optimization (with respect to the event consumers), the Event Service system 112 may allow event consumers to specify at registration time also what information contained in the event attributes is of interest to them. This feature is useful in cases when complex events occur, resulting from the correlation of a multiplicity of different and/or the same type of events.

Through the Event Service system 112 the PAE 110' depends on input data from the following middleware entities (in the following referred to as local event producers):

the Network Information Engine (NIE), which is used to detect events concerning the discovery of networks, mobile terminals and services as well as for getting events concerning the discovery of mobile terminals and/or services within a certain radius around the mobile terminal 504 hosting the PAE 110' and the Person Identification Unit (PIU), which is used to detect events concerning the discovery of users (by whatever means) in a mobile network environment as well as for getting events concerning the discovery of users within said radius.

Remote event producers are the local event producers of another computational unit forwarding their event notification messages to the given PAE 110' via network connections. These remote event producers can include services or any type of sensor device deployed in the given network.

In one embodiment of this invention, a Context Processing system 114 is employed between the Event Service system 112 and the local/remote event producers (the NIE, the Person Identification Unit (PIU) and remote event producers) to deduce more refined information about the actual context from raw data contained in the event notification messages. The Event Correlator feature of the Event Service system 112 may well be considered as a part of the Context Processing system 114. To this extent, the use of a framework for statically or even dynamically implementing various configurations of the Context Processing system 114 is envisioned. The use of a Context Processing system 114 also allows to include additional context data in the context computation model which is not a part of even notification messages. It is rather retrieved by explicitly polling on-demand specific context data sources such as sensors (e.g. thermo sensors) or a database.

The Binding Creation Engine 108 depends on a Metadata Management unit 102, which is used for managing the storage and retrieval of bindings (along with specifications of profiles and triggering conditions). The Binding Creation Engine 108 allows users to save any created bindings for later reuse by using said Metadata Management unit 102.

The General Application system 104 and the General Service system 106 model the actual clients of the PAE 110'. The General Application system 104 thereby registers, activates, deactivates or deregisters a binding with the PAE 110' via a specific PAE Core API. To this extent, the Binding Creation Engine 108 can be considered as a special case of a General Application. However, the Binding Creation Engine 108 does not only use said API, it also shares the interface with the General Applications system 104 for managing bindings as meta data. The General Service system 106 is responsible for offering the implementations of the primitives they publish and which are used for defining the actions stored in the profiles.

The following set of definitions constitute the data model for the PAE concept according to one embodiment of the present invention as illustrated in the UML class diagram depicted in FIG. 2.

Profile: A Profile 210 is defined as a list of Actions 214 which can also include references to other Profiles. It is modeled according to the Composite Design Pattern described in the book "Design Patterns—Elements of Reusable Object-Oriented Software" (in: Addison Wesley, Reading, Mass. (USA), 1994, ISBN 0-201-63361-2) by E. Gamma et al.

Triggering Condition: A Triggering Condition 204—a Boolean expression—describes what has to happen for triggering an automatic execution of a Profile 210. It can be defined recursively.

Binding: A Binding 206 is a container that combines a Profile 210 with a Triggering Condition 204, thus specifying the Profile 206 that has to be executed if the given Triggering Condition 204 yields "TRUE". More complex Boolean expressions can be specified by combining a variety of Triggering Conditions 204 at binding level. A Binding 206 can be defined as activated or deactivated: If the Triggering Condition 204 yields the value "TRUE" and the Binding 206 is activated, the bound Profile 210 (in terms of a list of Actions 214) is executed. An activated Binding 206 indicates that a given (simple or combined) Triggering Condition 204 is "armed". A Binding 206 can be created as already activated or deactivated based on an explicit constructor parameter that is passed by the creator of the Binding (a user or a developer).

Target Service: A Target Service 212 identifies the General Service 106 that supports the execution of an Actions 214 upon the activation of a Profile 210.

The Actions 214 are thereby grouped per Target Service 212: A Profile 210 can in fact list Actions 214 that shall be executed by various services, irrespective whether they are installed on the same device as the given PAE 110' or on remote devices.

Individual Actions 214 may optionally be qualified by a Guard condition, which is used for fine-tuning the behavior of the respective Action 214. To this extent, the following key issues have to be considered:

Who defines (and how) the guard variables: Guard variables monitor certain properties of specific parts of a mobile terminal 504. Those parts which are based on well-defined contracts should publish such properties. The Profile creator should be able to include guard variables while creating a given Profile 210 by simply browsing lists of published Guards 208.

In which context are the guard variables defined: The choice of guard variables should be restricted to only those properties which are explicitly published by Target Services 212 that are based on well-defined contracts. These services may be installed on the same device (local context) or on other devices (remote context).

How can guard variables be evaluated: Once the Triggering Condition 204 is met, the PAE 110' should execute each Action 214 listed in a Profile 210, provided that the corresponding guard variable, if any, yields "TRUE". To this extent, the PAE 110' should retrieve the current value of the property indicated in the guard statement and evaluate the Boolean expression of the Guard 208. In case the given property belongs to a service located on another mobile terminal, the PAE 110' should explicitly retrieve this information in order to evaluate the Boolean expression of the Guard 208.

It should be noted that Guards 208 may also contain Boolean expressions which involve more than one locally or remotely defined property. Guards 208 are defined by the interface of the underlying Services the corresponding Actions deal with.

According to one embodiment of the present invention, the following two levels of Profiles are envisioned: user-level Profiles and service-provider-level Profiles. Thereby, the user directly specifies the former by using a list of said properties (for defining Guards 208) and primitives (for defining the Actions 214 to take) that are published by a given service (e.g. as a remote interface).

The manufacturer thereby specifies the service-provider-level Profile to indicate what specific fine-grained primitives are exported by the respective service and which combinations thereof are required to implement the user-level Actions (thus avoiding the user to have indepth knowledge about the given service).

According to a further aspect of the invention, the PAE 110' is able to obtain information about remote interface definitions and service-provider-level Profiles in the following two complementary ways: by means of a dynamic retrieval or by means of a static retrieval.

Dynamic retrieval: For a dynamic retrieval various alternative options are envisioned. For example, information can proactively be disseminated via the Service Discovery Protocol (SDP) over time. Alternatively, said information is retrieved by explicitly querying services (as soon as they have been discovered)—on the assumption that these services publish such information as a specific attribute. This information can also be retrieved by querying a proxy entity which supports services which run on devices with limited capabilities (especially concerning memory or the enforcement of legacy interfaces).

Static retrieval: In this case, said information is retrieved from a local or remote persistent repository. As this information (per service/device type) is not supposed to change frequently over time, one may assume that the corresponding description is included in a Profile library whose updates can be downloaded from e.g. a web server.

In any case, any dynamically retrieved remote interface definitions and service-provider-level Profiles can conveniently be stored locally or remotely for a faster static retrieval that is performed later.

The definition of Profiles may be completed with parameter lists for the primitives indicated in the Actions 214, wherever applicable. The actual value of the parameters should be included in the Profile 210.

Formal parameters may also be included in the primitives indicated in the Actions 214, wherever applicable. In this way, the PAE 110' will always be able to send to the service which implements the respective primitive any piece of information determined by the PAE 110' at run time (e.g. the identifier of a service detected by the NIE).

This information might in fact be of relevance for allowing the service that implements the primitive indicated in a given Action 214 to take appropriate decisions. For instance, an automatic photo synchronization application might want to avoid synchronizing images on multiple image management services. It might rather want to choose only a specific one which is determined at runtime.

According to a further embodiment of the invention, the specification of said Bindings 206, Profiles 210, and Triggering Conditions 204 is achieved in two ways:

by using a declarative language for defining Bindings 206, Profiles 210, and Triggering Conditions 204 and by directly creating an object model using the object-oriented API exposed by the PAE Core 110. In this case, persistency of the Binding, Profile, and Triggering Condition specifications is achieved by serializing the runtime image of said object model.

According to one aspect of the present invention, a custom grammar is used for expressing Boolean expressions with respect to Triggering Conditions 204 (and, optionally, also with respect to the Guards 208). According to a further aspect of the invention, existing standards such as XPath or MathML are envisioned.

The syntax of the Action description may be modeled according to the syntax of the remote procedure call (RPC) mechanism of choice: This requires addressing the issue of adapting the Profile specification with the chosen mechanism (SOAP, XML RPC, etc.). However, in order to achieve independence from the RPC mechanism used and because some Target Services 212 may also be hosted on the same mobile terminal where the given PAE Core 110 is installed and operates, the present invention prescribes the use of a simple Profile specification language. This implies the use of a translator mechanism for mapping the respective Action description contained in the Binding specification to the actual remote procedure call mechanism in case the latter differs from the one whose syntax has been used for specifying the Profile 210.

For Target Services 212 which are installed on mobile terminals other than the one on which the above-described PAE Core 110 is installed and operates the description of their remotely controllable interface and the list of their published properties (also known as "state variables") are made available via Service Discovery Protocol (SDP) to the creator of a Binding 206 for selecting which Action 214 to specify and to the PAE Core 110 for invoking Actions 214 when applicable. The description of Target Services 212 installed on the same mobile terminal on which the PAE Core 110 is installed and operates should equivalently offer the same information. For this reason, the present invention abstracts the retrieval of this published information from distribution aspects.

Moreover, the invention allows the user to specify formal parameters in local and/or remote procedure calls, but limited to the set of those parameters which are published as a part of the Target Services' interface description (that can be retrieved via SDP) and known at the time the Profiles 210 and Triggering Conditions 204 have been specified. This means that the PAE 110' automates only the execution of those Target Services 212 whose published contracts match the ones used in the Profile and Triggering Condition specifications.

For the sake of simplicity, the PAE Core 110 does not directly check error values of local and remote procedure calls. For more complex Profiles 210 featuring conditional branches and loops a scripting language is in fact required. To this extent, the PAE 110' uses a delegation model: Whenever a Profile 210 requires a complex logic to be specified, a specific Action 214 is correspondingly inserted into the Profile 210. This Action 214 invokes a local service which separately interprets the respective script (passed as a parameter of the given Action 214) and invokes commands on local and remote Target Services 212 accordingly. The middleware entity dealing with such additional functionality is the Script Interpreter 116 depicted in FIG. 1.

Following the same delegation principle as described above, the PAE Core 110 can delegate any complex processing of the data carried in the received event notification messages to an external entity. The aforementioned Event Correlator functionality is another example application of this principle. According to one aspect of the present invention, this principle can be extended to more general computations by using the concept of a dynamically configurable context system as disclosed in EP 1 298 527 A1. Furthermore, the implementation of RPC mechanisms can totally be delegated to a single middleware entity instead of having the PAE Core 110 relying directly on an interface-specific support code (e.g. stubs). In this way, the Action specifications may be expressed in an abstract syntax which is not bound to the specific RPC mechanism of choice (e.g. SOAP, XML RPC, etc.).

Figure 3:
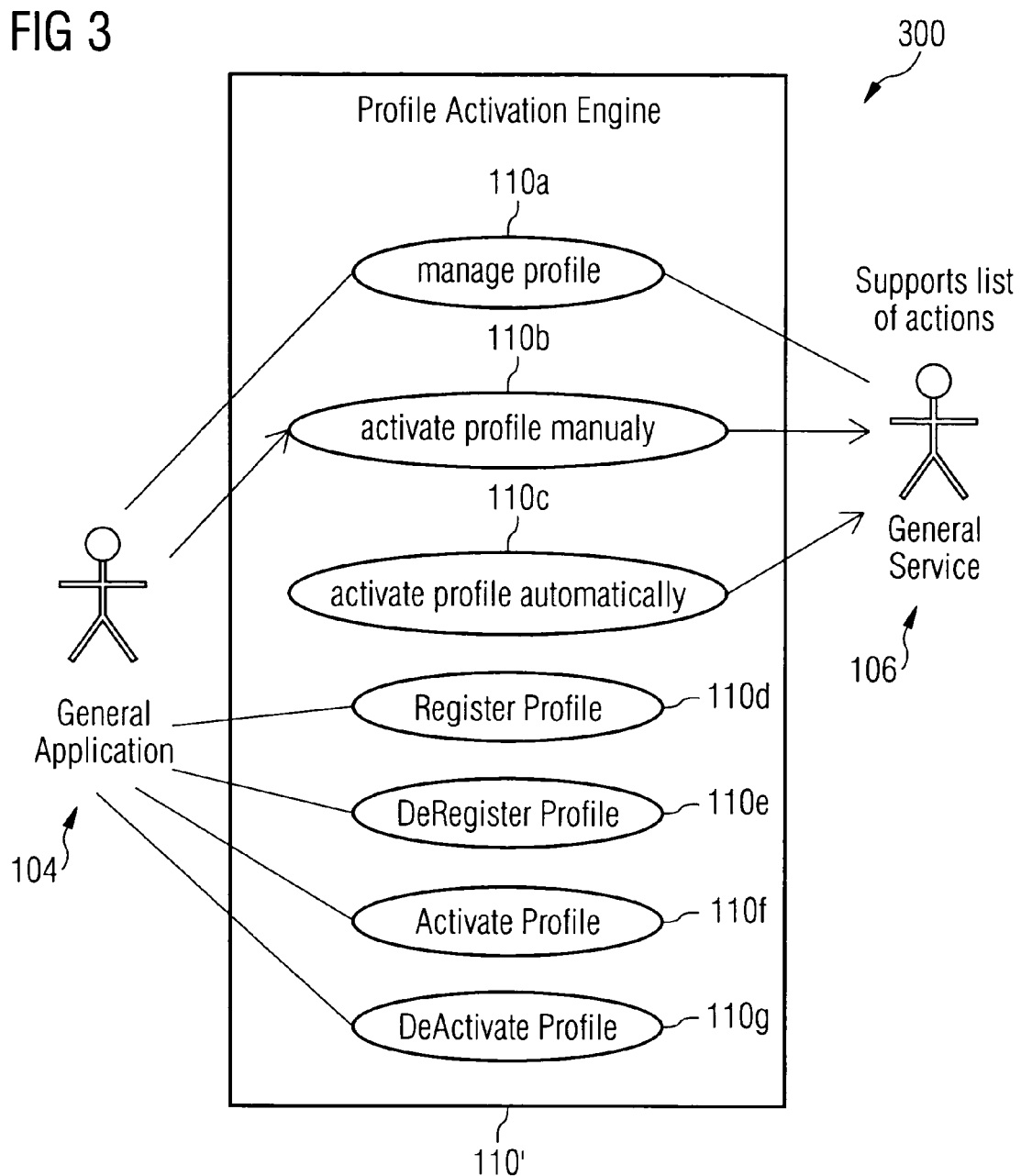
FIG. 3 is a UML use case diagram illustrating the core PAE concept according to the present invention.
Figure 6A:
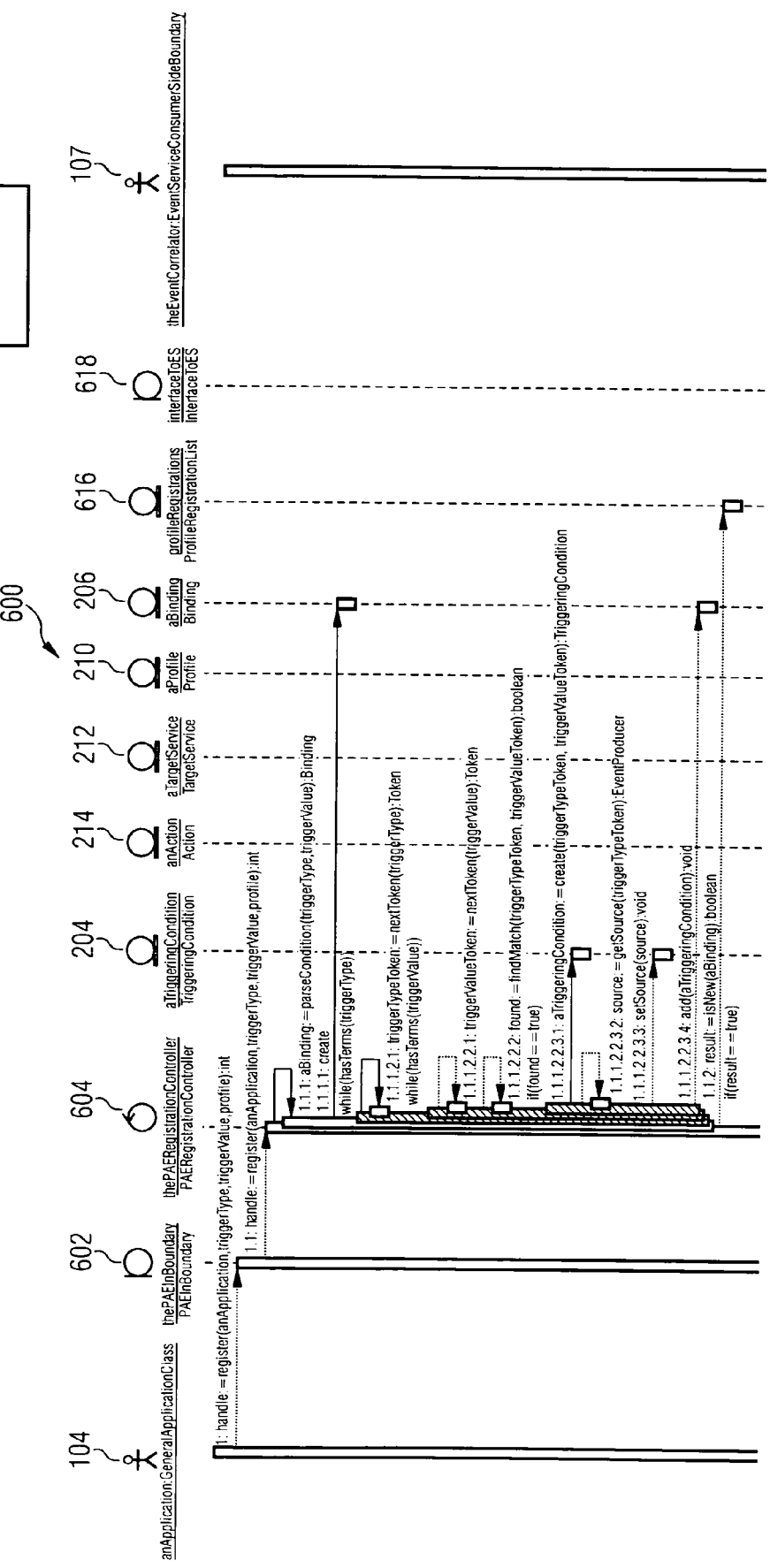
FIG. 6 is a UML sequence diagram showing the interactions between a general application entity, various middleware entities that are part of one embodiment of this invention, and an entity modeling the service consumer side boundary in case of a successful profile registration.
Figure 6B:
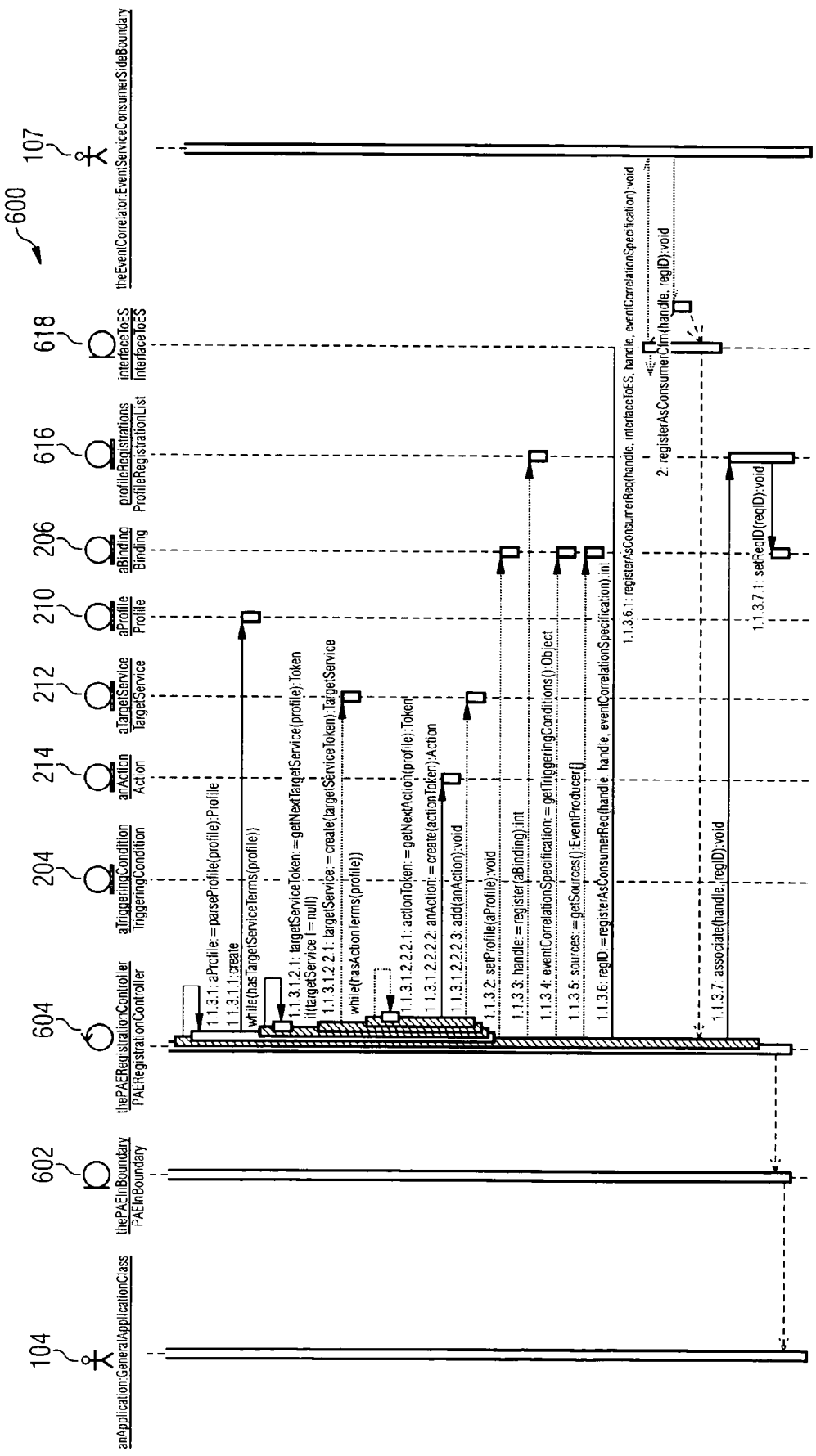
Figure 9:
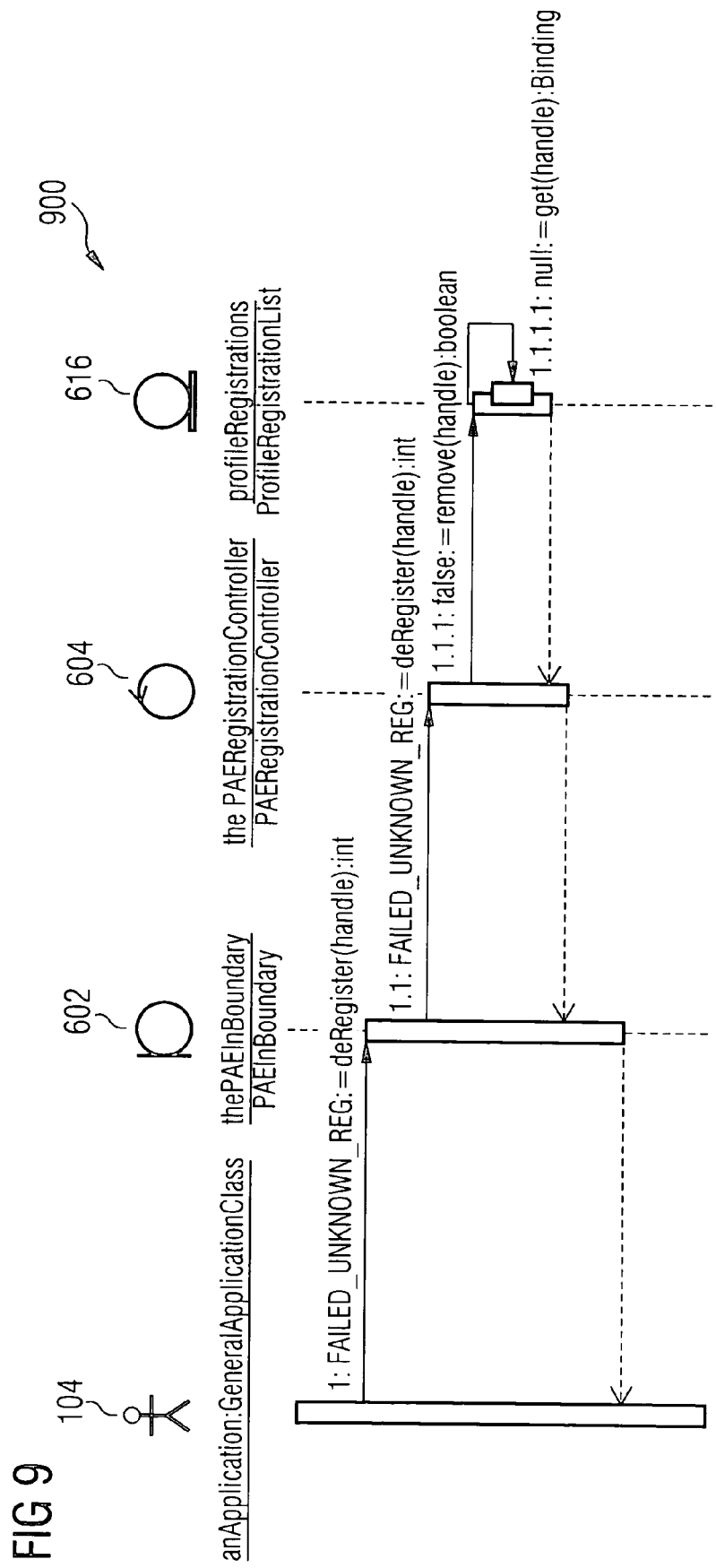
FIG. 9 is a UML sequence diagram showing the interactions between a general application entity and three middleware entities that are part of one embodiment of this invention in the error case of a failed deregistration of a binding for an alternate flow while trying to deregister a not existent binding.
Figure 10:
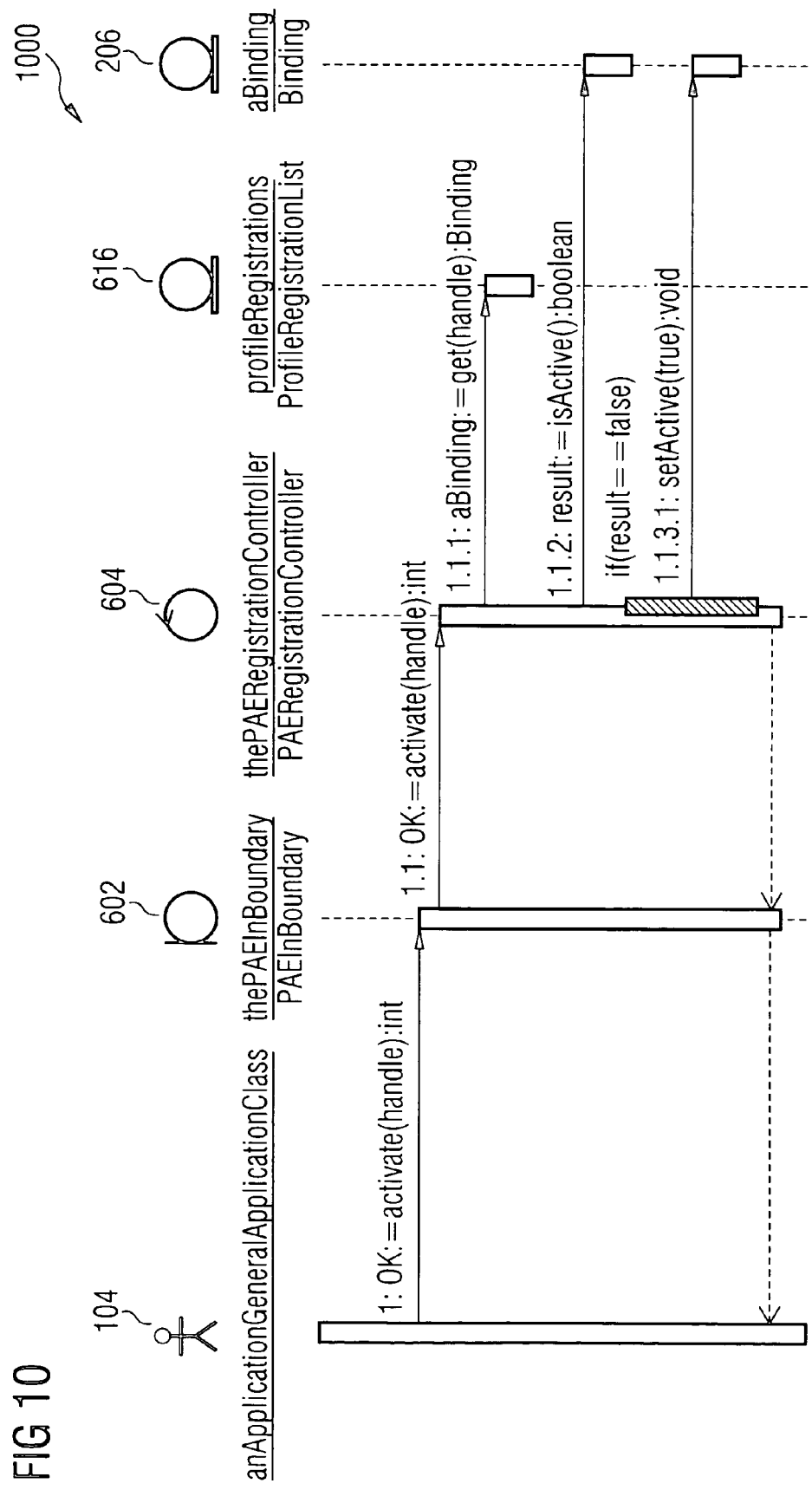
FIG. 10 is a UML sequence diagram showing the interactions between a general application entity and four middleware entities that are part of one embodiment of this invention in case of a successful binding activation for the base flow.
Figure 11:
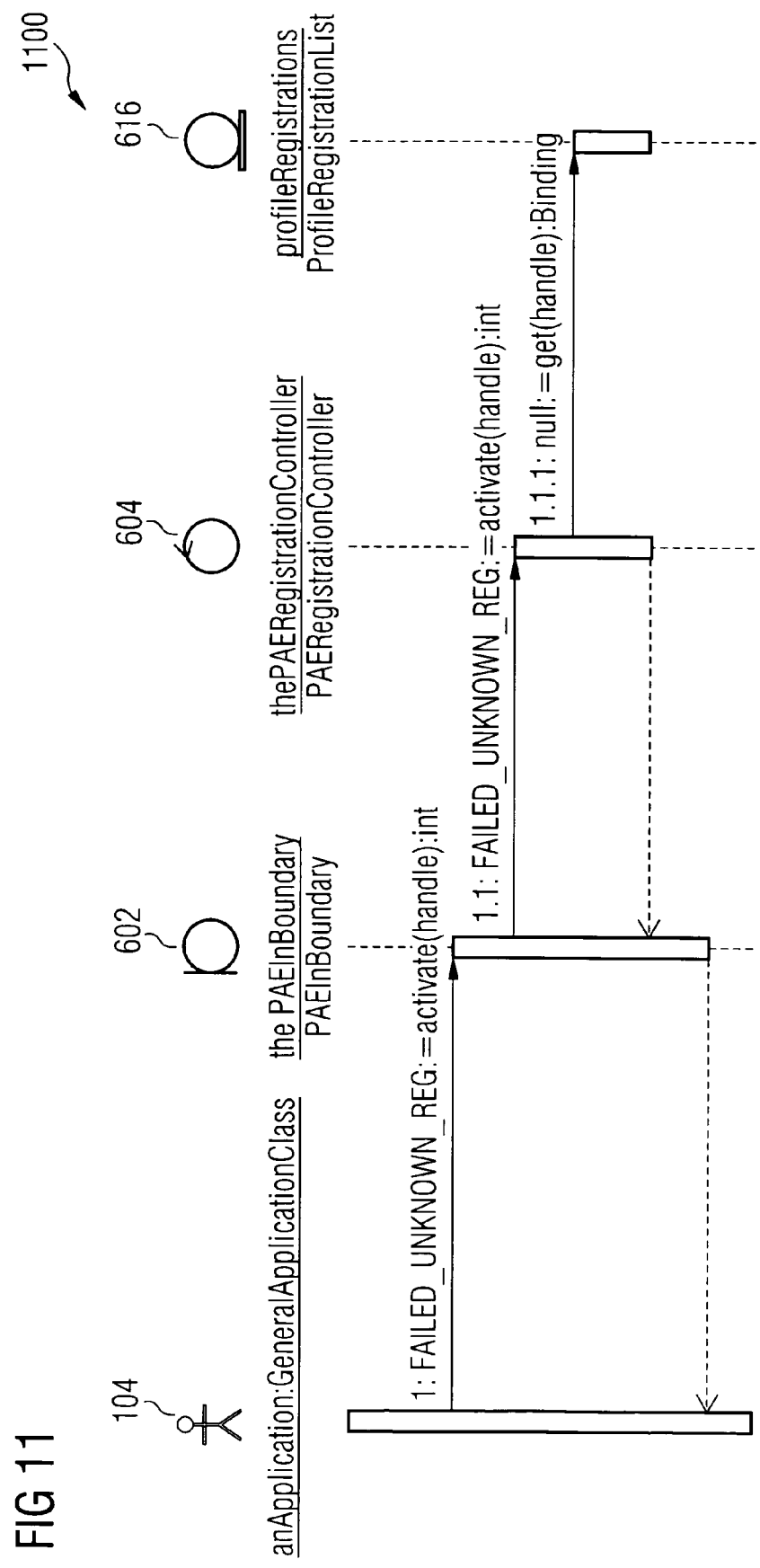
FIG. 11 is a UML sequence diagram showing the interactions between a general application entity and three middleware entities that are part of one embodiment of this invention in the error case of a failed binding activation for the alternate flow since no such binding is registered.
Figure 12:
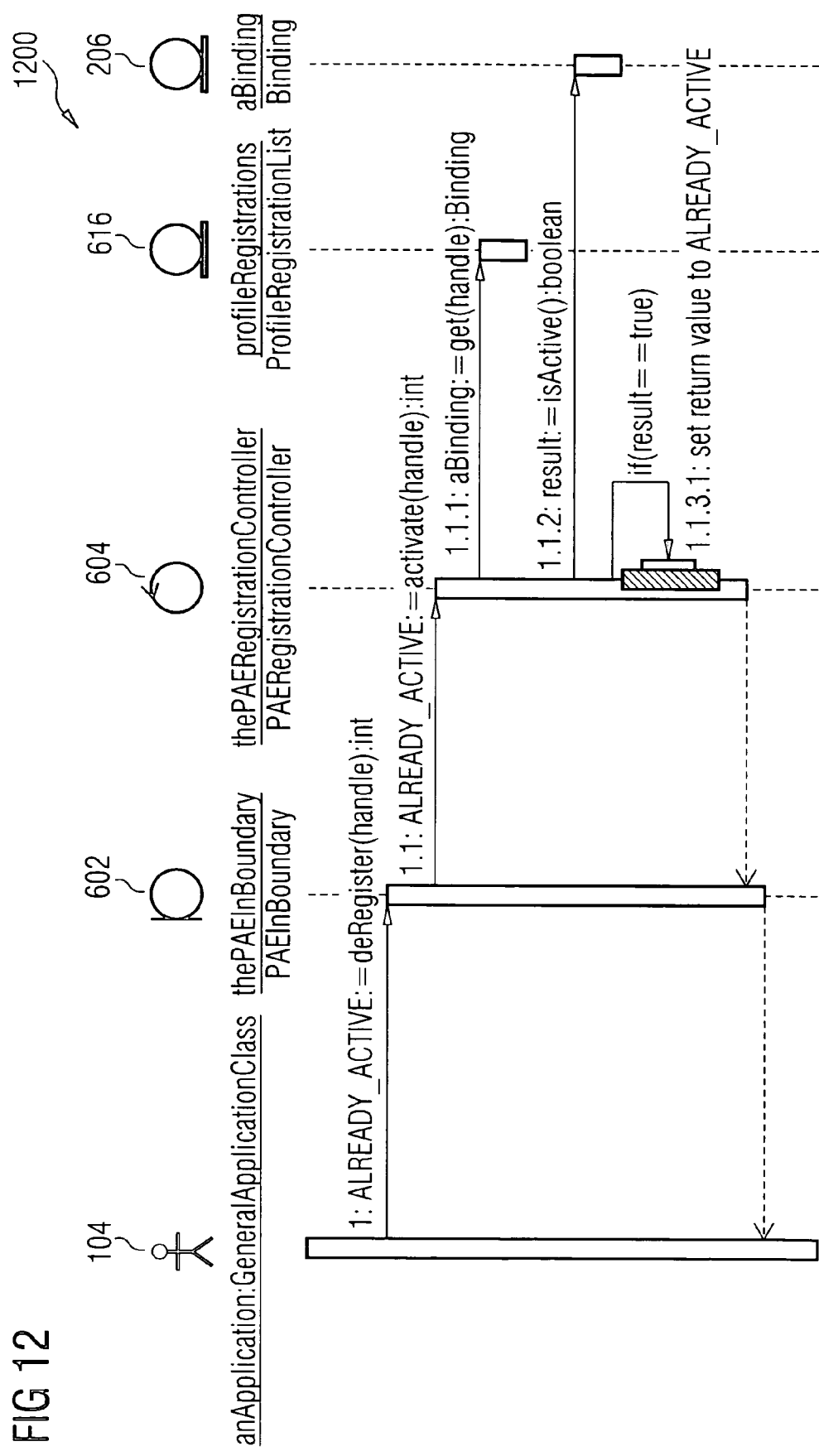
FIG. 12 is a UML sequence diagram showing the interactions between a general application entity and four middleware entities that are part of one embodiment of this invention in the error case of a failed binding activation for the alternate flow since the given binding is already activated.
Figure 13:
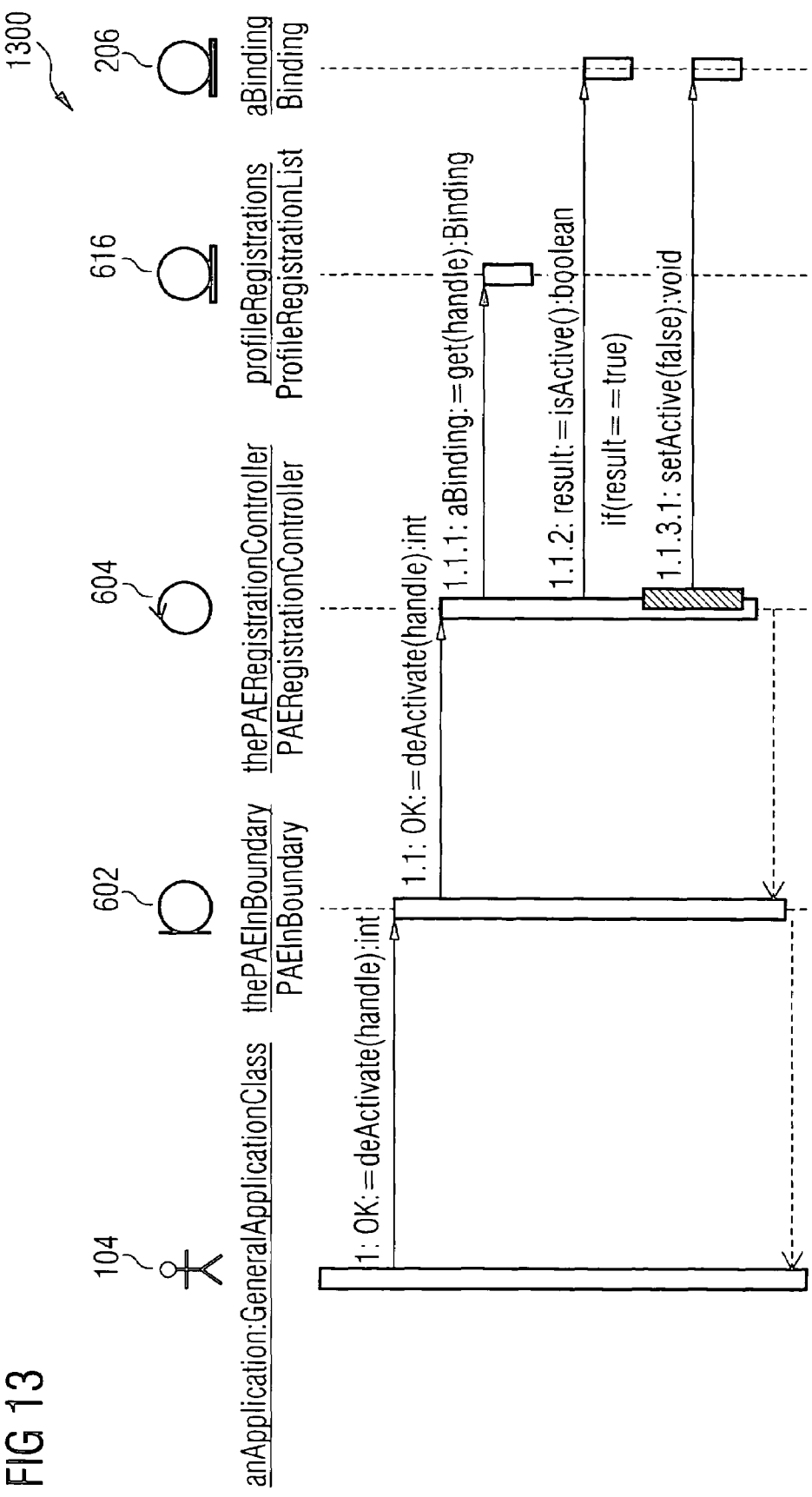
FIG. 13 is a UML sequence diagram showing the interactions between a general application entity and four middleware entities that are part of one embodiment of this invention in case of a successful deactivation of an active binding.
Figure 14:
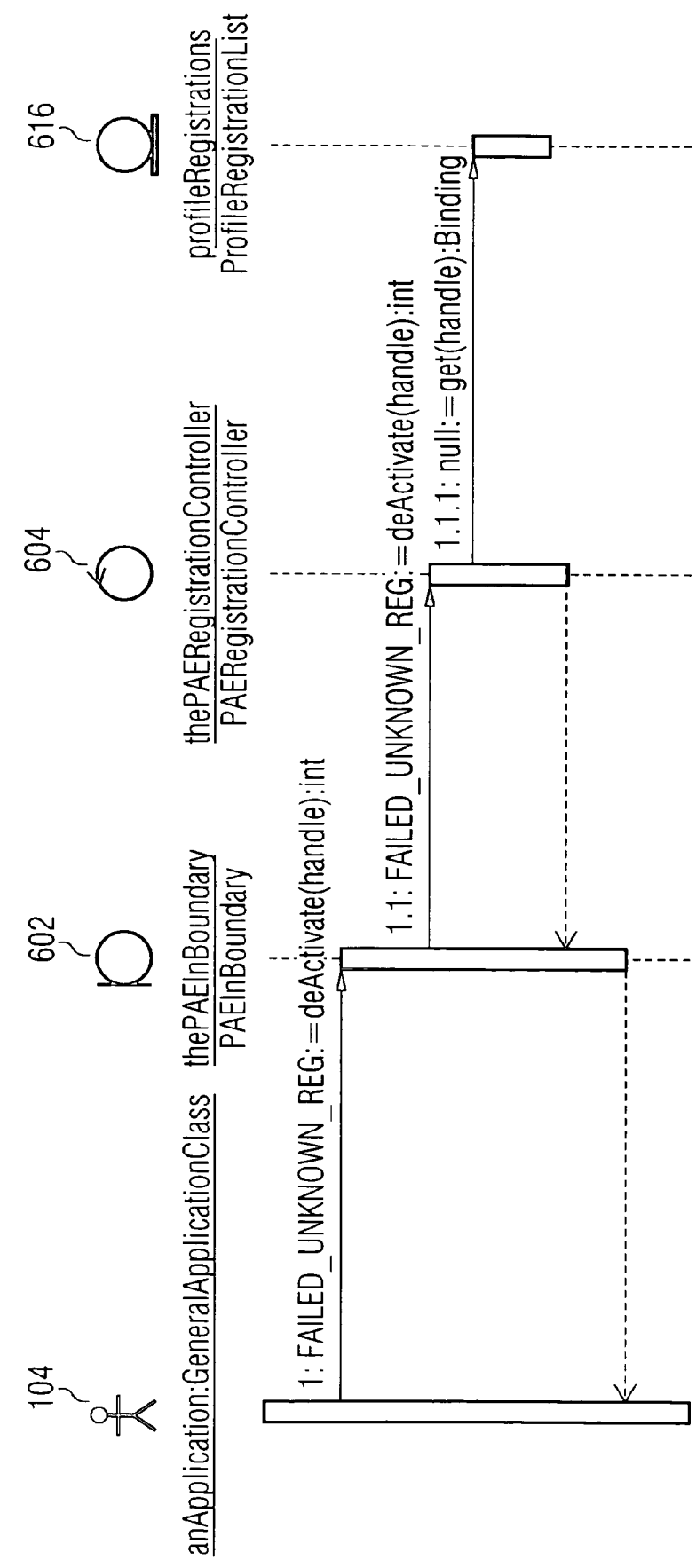
FIG. 14 is a UML sequence diagram showing the interactions between a general application entity and three middleware entities that are part of one embodiment of this invention in the error case of a failed deactivation of an active binding for the alternate flow since the given binding has not been registered.
Figure 15:
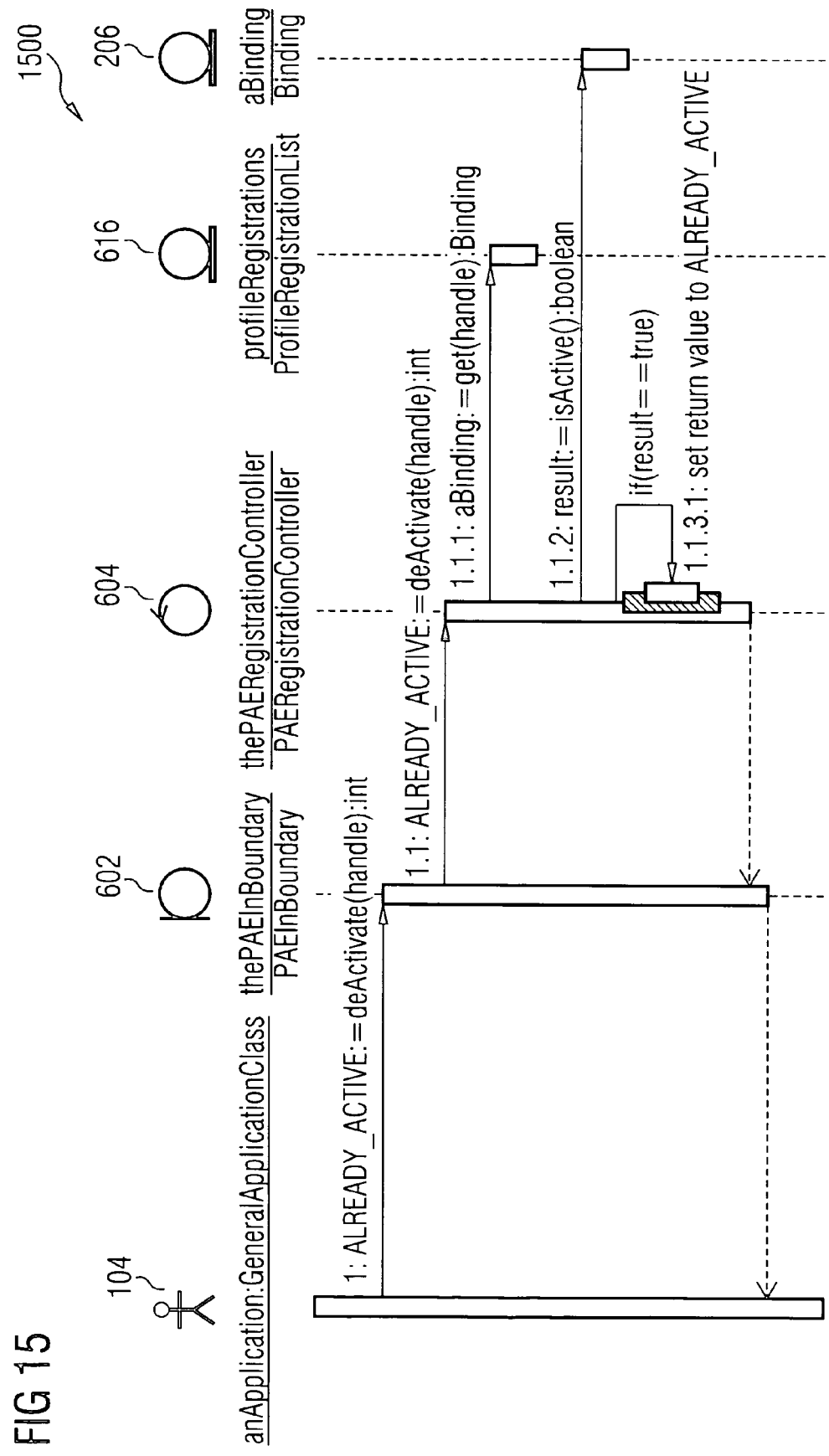
FIG. 15 is a UML sequence diagram showing the interactions between a general application entity and four middleware entities that are part of one embodiment of this invention in the error case of a failed deactivation of an active binding for the alternate flow since the given binding was already inactive.
Figure 16:
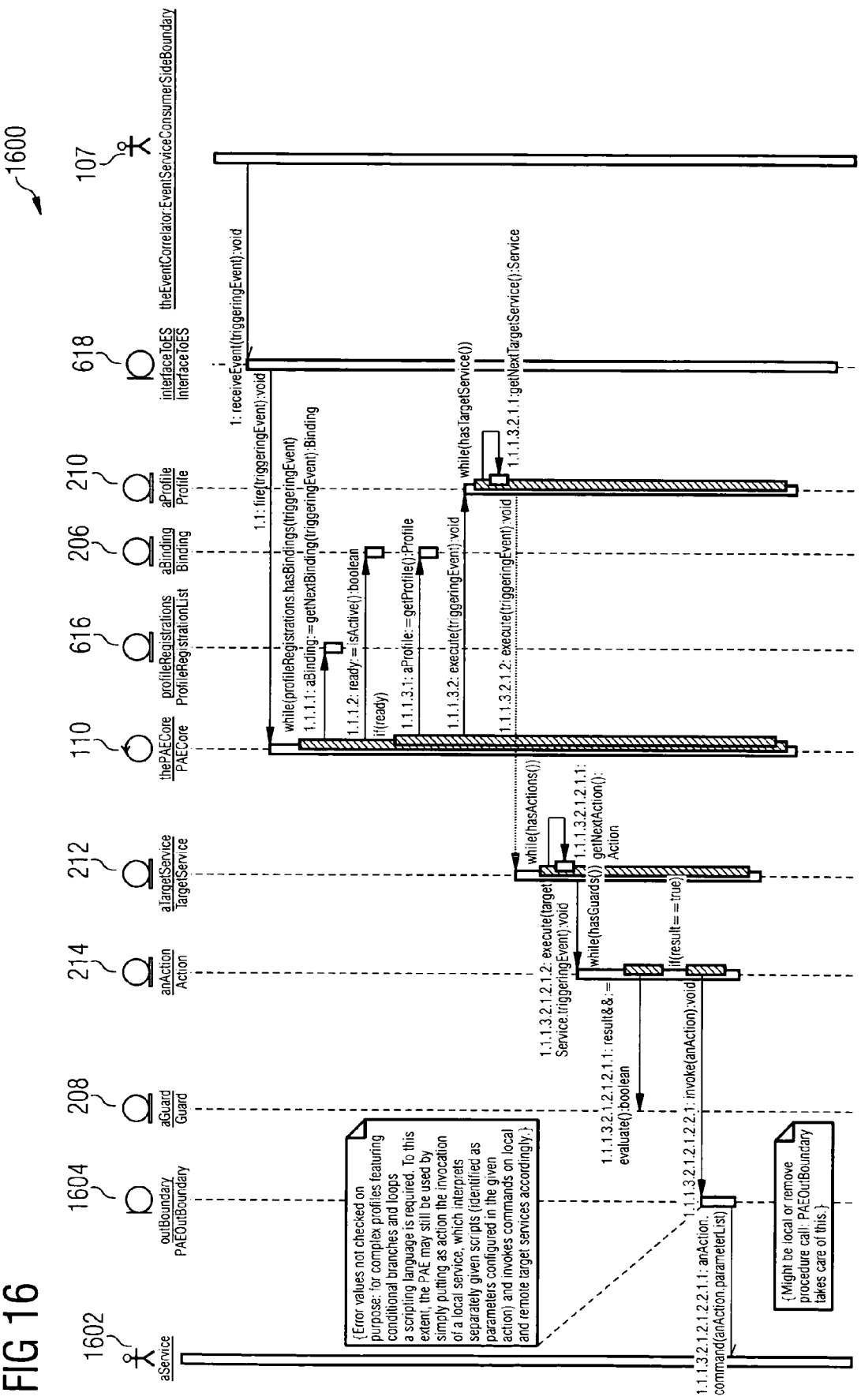
FIG. 16 is a UML sequence diagram showing the interactions between a general application entity, nine middleware entities that are part of one embodiment of this invention and an entity modeling the service consumer side boundary in case of a successful automatic profile activation for the base flow.
Figure 17:
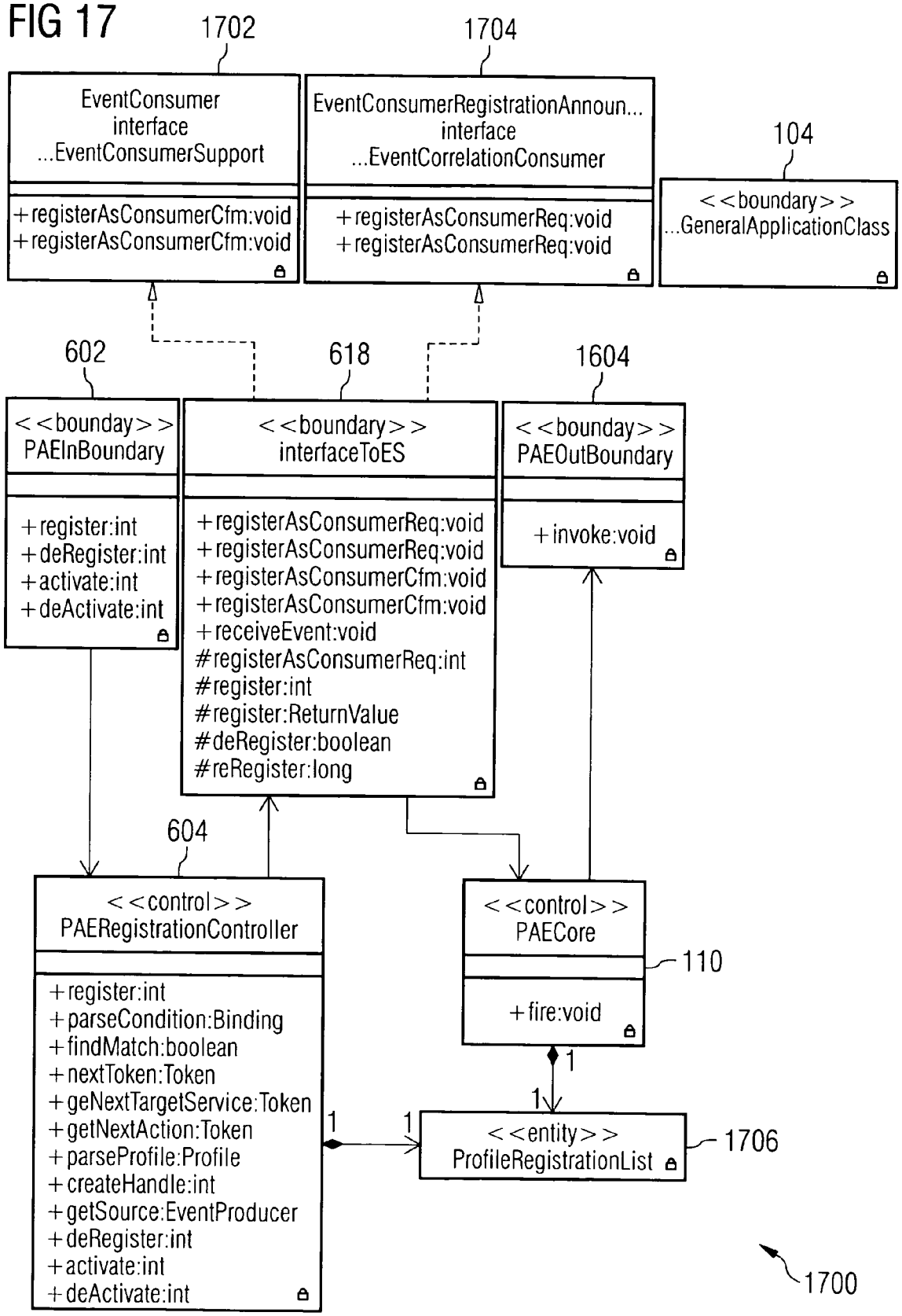
FIG. 17 is a UML class diagram showing the analysis classes that are part of one embodiment of this invention, stereotyped as "boundary" and "control" classes, respectively.
Figure 18:
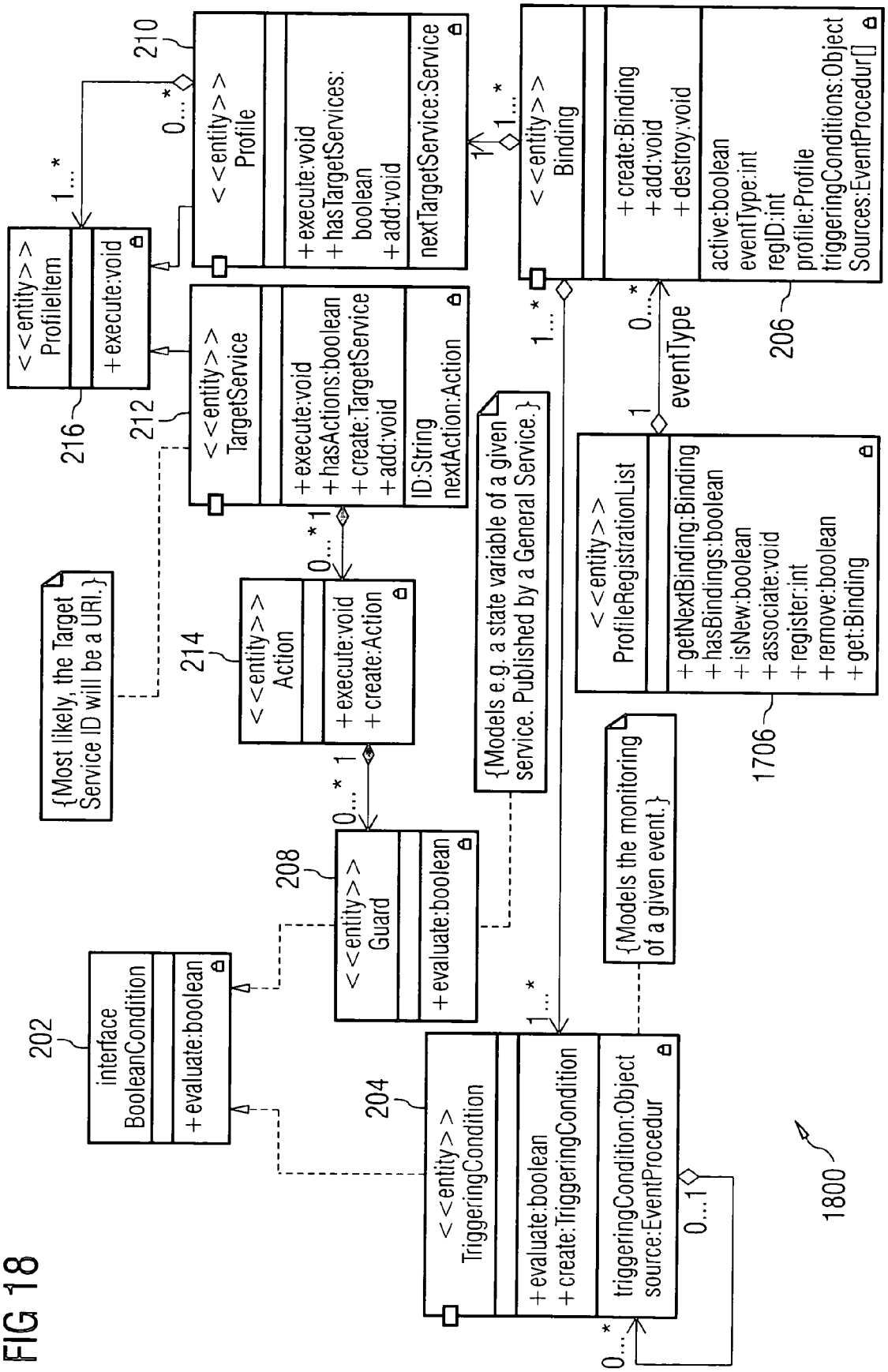
FIG. 18 is a UML class diagram showing the analysis classes that are part of one embodiment of this invention, stereotyped as "entity" classes.

In the following section, the PAE concept according to the present invention shall be illustrated by means of the UML use case diagram depicted in FIG. 3, which shows the actors (the General Application 104 and the General Service 106) as well as the applied use cases (the manage profile 110a, the activate profile manually 110b, the activate profile automatically 110c, the Register Profile 110d and the DeRegister Profile 110e, the Activate Profile 110f and the DeActivate Profile 110g).

The "General Application" actor 104 uses the interfaces of the PAE middleware entity 110' hosted by the respective mobile terminal 504. By contrast, the "General Service" actor 106 represents any functionality that can be accessed and used by a number of mobile terminals 504 interconnected via a mobile ad-hoc network 502a as depicted in FIG. 5. It is visible and accessible through a well-defined interface to the mobile terminals 504 (e.g. for allowing the mobile terminals 504 to remotely control the General Service 106).

The following tables give an brief survey of the aforementioned use cases 10a-g:

| a) Use Case: manage profile 110a | |
|---|---|
| Identifier: | FCR-128 |
| Description: | A General Application 104 can add, modify and remove Profile information, including Triggering Conditions 204 and Bindings 206. |
| Precondition: | None |
| Post-Conditions: | Information about existing Profiles 210, Triggering Conditions 204 and Bindings 206 has been passed from the middleware entity 110' to the General Application 104. |
| | Information about modification of Profiles 210, Triggering Conditions 204 and Bindings 206 has been passed from the General Application 104 to the middleware entity 110'. |
| | A General Service 106 has been asked for a "list of Actions" which can be used by the General Application 104 for specifying a number of Profiles 210. |
| Normal Flow: | The General Application 104 retrieves all available information about existing Profiles 210, Triggering Conditions 204 and Bindings 206 passed from the middleware entity 110'. |
| | The General Application 104 passes new information and/or modified Profiles 210, Triggering Conditions 204 and Bindings 206 to the middleware entity 110'. |

-continued

| | |
|---|---|
| | General Services 106 provide their functionality by means of a "list of Actions". A General Service 106 can be asked for such a list, which can thereafter be used by the General Application 104 for specifying Profiles 210. |
| Alternate Flows: | None |

| b) Use Case: Register Profile 110d | |
|---|---|
| Identifier: | FCR-171 |
| Description: | The registration of a given Profile 210 by means of the PAE 110' in association with a given Triggering Condition 204. |
| Precondition: | The General Application 104 has retrieved a given Profile 210 (either hard-coded in the application itself, from a database, or created by the user from scratch with the aid of a Profile creation tool). |
| Post-Conditions: | The Profile registration has been managed. |
| Normal Flow: | The General Application 104 registers a given Profile 210 in association with a given Triggering Condition 204 by using the PAE 110'. |
| | The PAE 110' verifies that the given Profile 210 has not yet been registered for the same Triggering Condition 204. |
| | The PAE 110' registers the Triggering Condition 204 in case no other Profiles 210 are yet associated with that condition. |
| | The PAE 110' associates the given Profile 210 with the given registered Triggering Condition 204. |
| | The PAE 110' sets the given Profile 210 as activated or deactivated, depending on the indication passed by the General Application 104 as described above (see table a), Normal Flow). |
| | The PAE 110' returns a message indicating a successful operation to the General Application 104. |
| Alternate Flows: | FCR-171.1: The given Profile has already been registered in association with the given Triggering Condition 204. In this case, the PAE 110' returns an error indication to the General Application 104. |

| c) Use Case: DeRegister Profile 110e | |
|---|---|
| Identifier: | FCR-172 |
| Description: | The deregistration of a given Profile 210 by means of the PAE 110'. |
| Precondition: | The General Application 104 has knowledge of a Profile 210 that should be registered by means of the PAE 110'. |
| Post-Conditions: | The Profile deregistration has been managed. |
| Normal Flow: | The General Application 104 deregisters a given Profile 210 in association with a given Triggering Condition 204 by using the PAE 110'. |
| | The PAE 110' verifies that the respective Profile 210 has not yet been deregistered for the same Triggering Condition 204. |
| | The PAE 110' disassociates the respective Profile 210 with the given Triggering Condition 204. |
| | The PAE 110' deregisters the Triggering Condition 204 in case no other Profiles 210 are associated with that condition. |
| | The PAE 110' returns a message indicating a successful operation to the General Application 104. |
| Alternate Flows: | FCR-172.1: The given Profile has not previously been registered in association with the given Triggering Condition 204. In this case, the PAE 110' returns an error indication to the General Application 104. |

| d) Use Case: Activate Profile 110f | |
|---|---|
| Identifier: | FCR-173 |
| Description: | The activation of a given registered Profile 210. |
| Precondition: | The General Application 104 has knowledge of a Profile 210 that should be registered as deactivated by means of the PAE 110'. |
| Post-Conditions: | The Profile activation has been managed. |
| Normal Flow: | The General Application 104 requests the PAE 110' to activate a given Profile 210. |
| | The PAE 110' verifies that the given Profile 210 has previously been registered and deactivated. |
| | The PAE 110' activates the given Profile 210. |
| | The PAE 110' returns a message indicating a successful operation to the General Application 104. |

| | -continued |
|---|---|
| Alternate Flows: | FCR-173.1: The given Profile has not previously been registered in association with the given Triggering Condition 204. In this case, the PAE 110' returns an error indication to the General Application 104.<br>FCR-173.2: The given Profile 210 has not previously been deactivated. In this case, the PAE 110' also returns an error indication to the General Application 104. | e) Use Case: DeActivate Profile 110g

| | |
|---|---|
| Identifier: | FCR-174 |
| Description: | The deactivation of a given registered Profile 210. |
| Precondition: | The General Application 104 has knowledge of a Profile 210 that should be registered as activated by means of the PAE 110'. |
| Post-Conditions: | The Profile deactivation has been managed. |
| Normal Flow: | The General Application 104 requests the PAE 110' to deactivate a given Profile 210.<br>The PAE 110' verifies that the given Profile 210 has previously been registered and activated.<br>The PAE 110' deactivates the given Profile 210.<br>The PAE 110' returns a message indicating a successful operation to the General Application 104. |
| Alternate Flows: | FCR-174.1: The given Profile has not previously been registered in association with the given Triggering Condition 204. In this case, the PAE 110' returns an error indication to the General Application 104.<br>FCR-174.2: The given Profile 210 has not previously been activated. In this case, the PAE 110' also returns an error indication to the General Application 104. | f) Use Case: activate profile automatically 110c

| | |
|---|---|
| Identifier: | FCR-130 |
| Description: | If a specific Triggering Condition 204 occurs and the Binding 206 to a Profile 210 is activated, this specific Profile 210 is accomplished, which results in a number of service-specific Actions 214. |
| Precondition: | A Profile 210, a Triggering Condition 204 and a Binding 206 have to be defined, and the Binding 206 has to be activated. |
| Post-Conditions: | A specific Profile 210 whose bound condition occurs has been executed. |
| Normal Flow: | In case a specific Triggering Condition 204 and the Binding 206 to a Profile 210 is activated, the specific Profile 210 is accomplished.<br>The execution of a Profile 210 results in a number of General-Service-specific Actions 214. |
| Alternate Flows: | None | g) Use Case: activate profile manually 110b

| | |
|---|---|
| Identifier: | FCR-129 |
| Description: | A user by using a General Application 104 can manually execute a Profile 210 which comprises of a sequence of Actions 214, which results in a number of service-specific Actions 214. |
| Precondition: | A Profile 210 must exist. |
| Post-Conditions: | The Profile 210 was activated. |
| Normal Flow: | Default: A Profile 210 is activated in case a specific Triggering Condition 204 occurs.<br>This use case enables a General Application 104 to explicitly execute a Profile 210 which comprises a sequence of Actions 214, which results in a number of service-specific Actions 214. |
| Alternate Flows: | None |

In the following sections, the PAE concept disclosed in the present invention is compared to the state of the art as described above in order to identify the main advantageous differences between the present invention and said state of the art.

The present invention is an application of the context awareness (CA) paradigm described above. Hence, the idea of automatically executing a specific system behavior (the Actions 214 of a Profile 210) based on context information (the occurrence of specific events) is not new. Also, the idea of a Context Processing system 114, e.g. a general-purpose engine capable of identifying a specific context from various sensor data and eventually triggering specific behavior on applications and/or other middle- or software entities, is not new.

However, the present invention discloses a specific CA application which targets wired and wireless ad-hoc networks for consumer electronics (CE) devices. Compared to conventional CA solutions according to the state of the art, the advantages of the invention can be summarized as follows:

Separation of concerns: The activation of a given Profile 210 differs from the monitoring of the corresponding Triggering Conditions 204 as well as from the creation and handling of Profiles 210 and Triggering Conditions 204. This results in a modular architecture which is based on well-defined interfaces identifying the contracts offered and used by said modules. According to one embodiment of the present invention, the PAE 110' includes the use of a full-fledged, dynamically configurable Context Processing system 114 with an integrated Event Correlator 107.

The enforcement of a simple Profile specification language, which is transparent of the actually used RPC mechanism, translates in portability of the PAE 110' with respect to the applied RPC mechanisms.

Profiles 210 can be specified at user level or at service provider level. In this way, non-expert users do not need to know how to specify the exact sequence of Actions 214 that have to be taken upon the occurrence of a certain event in order to achieve a desired effect. For instance, the action of switching a CD player from playing a given song from a first CD to another song from a second CD needs a specific set of Actions 214 which require some low-level knowledge of the CD player operation (1. stop current song played, 2. change disk, 3. seek new song's track, 4. play new song). The impact of such low-level knowledge is even more evident in case of errors or exceptional events for which specific corrective Actions 214 are required. Furthermore, such low-level set of Actions can advantageously be reused if packaged in a standalone Profile 210 which can be included (either by value or by reference) by multiple user-level Profiles (or even by other service-provider-level Profiles).

The static and dynamic retrieval of information about remote interface definitions and service-provider-level Profiles.

Simple scripting language for specifying Profiles: the delegation model described above allows in fact to move the handling of more complex Profile specifications to external handlers capable of interpreting a more powerful scripting language of choice. To this extent, the PAE 110' offers a well-defined interface for invoking the external Script Interpreter 116. One can regard this feature as extensibility of the Profile specification language. The PAE 110' may even use multiple handlers as long as information about what type of scripting language is used for expressing a given specification is provided.

Simple way of composing Triggering Conditions with Profiles through the concept of Binding, which allows reuse of pre-existing Triggering Condition and Profile specifications: The possibility of creating recursive specifications for Triggering Conditions 204 and Profiles 210 allows to create more complex Bindings 206 by reusing existing Triggering Condition and Profile specifications.

Simple way of activating and deactivating already installed associations of Triggering Conditions with Profiles with the aid of the Binding concept.

The present invention differs from the ad-hoc computing manager concept described in EP 1 107 512 A1 insofar as the latter focuses on abstracting the mechanisms for discovering devices and services in an ad-hoc network and on the dynamic, automatic assembly of a composite remote user interface to capitalize the wealth of functionality which can be discovered at run time in an ad-hoc network. Thereby, EP 1 107 512 A1 does not take into account context awareness aspects which involve the automatic execution of Actions 214 on the discovered entities (devices and/or services).

The present invention differs from the user profile data management system disclosed in EP 1 130 869 A1 insofar as the latter describes an architecture centered around the concept of a database which holds various versions of users' profiles in order to capture not only various users' preferences but also context data associated with said users for the sake of most appropriately forwarding instant messages to said users. However, EP 1 130 869 A1 does not consider the case of storing lists of Actions 214 in these user profiles to be automatically executed on dynamically discovered end systems. Notwithstanding, the present invention shares some of the concepts described in EP 1 130 869 A1, e.g. the easy extensibility and reuse of pre-existing Profiles 210. To this extent, the present invention uses composite design patterns as described in the book "Design Patterns—Elements of Reusable Object-Oriented Software" (in: Addison Wesley, Reading, Mass. (USA), 1994, ISBN 0-201-63361-2) by E. Gamma et al. for defining the Profile 210 (cf. FIG. 2), which inherently leads to a tree structure, similar to the tree structure described in EP 1 130 869 A1. However, EP 1 130 869 A1 does not decouple the Profile data from the actual Triggering Condition 204 as disclosed in the present invention but embeds information about elemental Triggering Conditions 204 in a sort of tag associated with each Profile 210. As a consequence, EP 1 130 869 A1 uses those tags for navigating through the tree of Profiles 210 to select the ones to activate, thus computing event correlation dynamically based on the input information and the content and structure of the Profile data. By contrast, the present invention proposes that the Triggering Conditions 204 (which may eventually be defined recursively to increase extensibility and reusability) are defined as separate entities—compared to the Profiles 210—and fed to an Event Correlator 107 for monitoring the point in time when the evaluation of these conditions yields "TRUE". To this extent, the present invention does not necessarily prescribe how the Event Correlator 107 should be implemented, but it uses the services offered by said Event Correlator 107 based on a specific, well-defined interface. Compared to EP 1 130 869 A1, the decoupling of Profiles 210 from Triggering Conditions 204 and the recursive specification of both Profiles 210 and triggering Conditions 204 thus lead to a much more flexible architecture.

The present invention differs from the context-aware mobile portal concept described in EP 1 199 860 A1 insofar as the latter focuses on automatically adapting the services offered by a WWW portal to the context data of a user accessing said WWW portal. Thereby, said services are augmented with services dynamically discovered within the given user's context and accessed by the user via remote user interfaces, i.e. via interactions of the respective user. By contrast, the present invention automates the execution of actions on the dynamically discovered services on behalf of the respective user.

The present invention differs from the system for automatically creating context information for setting up a sensor configuration described in EP 1 298 527 A1 insofar as the latter focuses only on a framework for dynamically deploying various context information processing logics and does not provide means for an automatic execution of Actions 214 as proposed by the present invention. However, the present invention advantageously uses the concept disclosed in EP 1 298 527 A1 with respect to the Event Service and, more specifically, the Event Correlator functionality. Also, as already mentioned in the discussion about context awareness, a full-fledged Context Processing system 114 based on the concept disclosed in EP 1 298 527 A1 might be particularly advantageous, especially with respect to the preprocessing of data carried in the event notification messages, before those events are fed to the PAE Core 110. In this way, the Triggering Condition and Profile Specifications are able to directly handle refined data without needing operations for obtaining such refined data from the plain content of event notification messages.

In the following section, an example for an application and a service using the PAE functionality according to the present invention is given as well as an example of a possible declarative language, which can be used to allow users and applications to register a Binding 206 with the aid of the PAE Core 110. In this example, which should be deemed as purely qualitative without making pretence to formal correctness, the aforementioned application is a wrapper around an automatic photo synchronization service that spawns and registers said service as a target of specific Actions 214 with the aid of the PAE Core 110. The Triggering Conditions 204 thereby consist in detecting the presence of a mobile ad-hoc network and of an Image Management System (IMS) within the given mobile ad-hoc network. Wherever applicable, the application may add to this Triggering Condition 204 any actual values specifying which specific IMS and/or which specific mobile ad-hoc network identifier the automatic photo synchronization service shall be triggered upon.

As a simple and quite general solution, such a Triggering Condition 204 can be expressed as follows. For the sake of simplicity, the ABNF syntax of a draft grammar is used.

```
trigger := triggerType ["AND" | "OR" | "XOR" ["NOT"] trigger]
triggerType := ("detectNetwork" | "detectDevice" | "detectService")
triggerValue := network-ID | device-ID | (serviceCategory
['serviceName])
network-ID := schema as defined by the network protocol layer
device-ID := schema as defined by the data link protocol layer
serviceCategory := schema as defined by the SDP
serviceName := arbitrary alphanumeric string
```

Finally, the application completes the registration by indicating which kind of Actions 214 shall be applied when detecting the presence of the IMS. The trigger type and trigger value can then be mapped to an event type and event instance value.

As a simple and quite general solution, a possible guard condition applicable to all types of triggers mentioned above could be named "result" and carry the event subtype (and eventually the event instance value), which would then take the following values:

"onFound", which indicates that the given Triggering Condition 204 has been met upon the discovery of the appearance of a network, device and/or service and "onLost", which indicates that the given Triggering Condition 204 has been met upon the discovery of the disappearance of a network, device and/or service.

As an example, the automatic photo synchronization application could create and register the following Binding 206, which is described as a pseudo XML document snippet depicted in FIG. 4).

The root of the XML document is the Binding 206 being specified, which—according to the data model depicted in FIG. 2—includes the attribute "active", which indicates whether that Binding 206 has been activated, a section which defines the Triggering Condition 204 (in this case, a Boolean expression), and a section which defines the Profile 210 wherein the Actions 214 are listed, ordered per target service (i.e. the service which provides the primitives implementing the respective Actions 214). In this case, the target element has the attribute "name" set to a URL indicating that the respective service is installed on the local device with respect to the PAE 110'. To this extent, a tentative syntax for the envisioned local/remote primitive invocation mechanism has been introduced for presentation purposes only. In case the target service is located on another device, the URL should indicate the name of said device instead of the default term "local".

Finally, one may want to allow the PAE to indicate to the automatic photo synchronization service which IMS was actually discovered. The example shown in FIG. 4 could then be modified to include as a formal parameter the triggerValue attribute of the element TriggeringCondition, i.e. as follows:

```
<alt value="onFound" Action="doSynchronization(int
    IMSName=//TriggerCondition/@TriggerValue,
    int imageNmb=065)"/>
```

It should be noted that in this qualitative example an XPath-like syntax has been used for identifying the attribute TriggerValue as a formal parameter. The actual syntax for the value of the Action attribute 214 actually depends on which remote service control mechanism is chosen.

Figure 19:
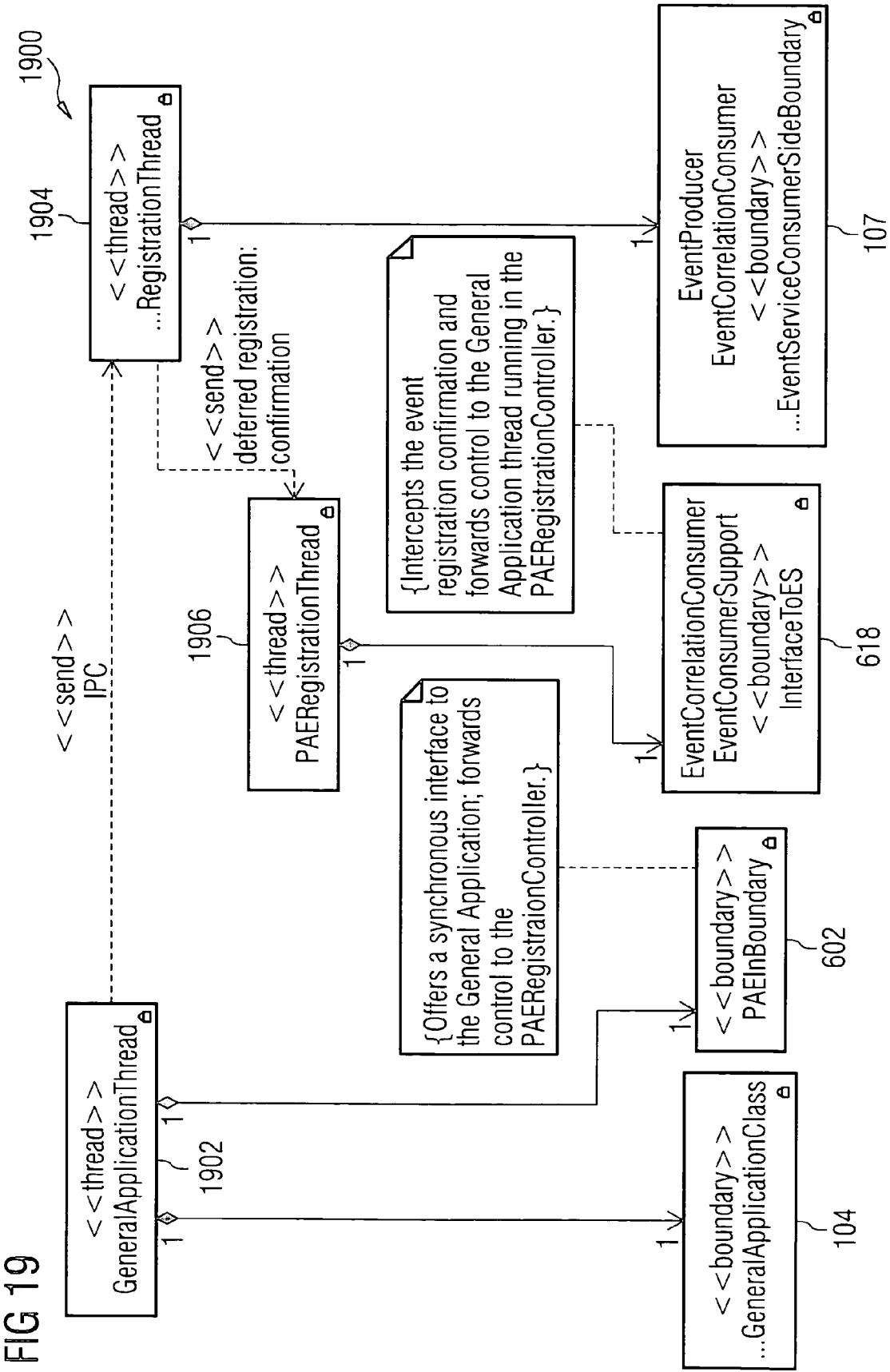
FIG. 19 is a UML class diagram showing the profile registration aspects of one embodiment of this invention in terms of a thread model which illustrates how said embodiment handles deferred event consumer registration confirmations generated by an event service, which is accessed by means of an asynchronous interface, and correlates them with suspended profile registrations requested to said embodiment via a synchronous interface for completing the latter.
Figure 20:
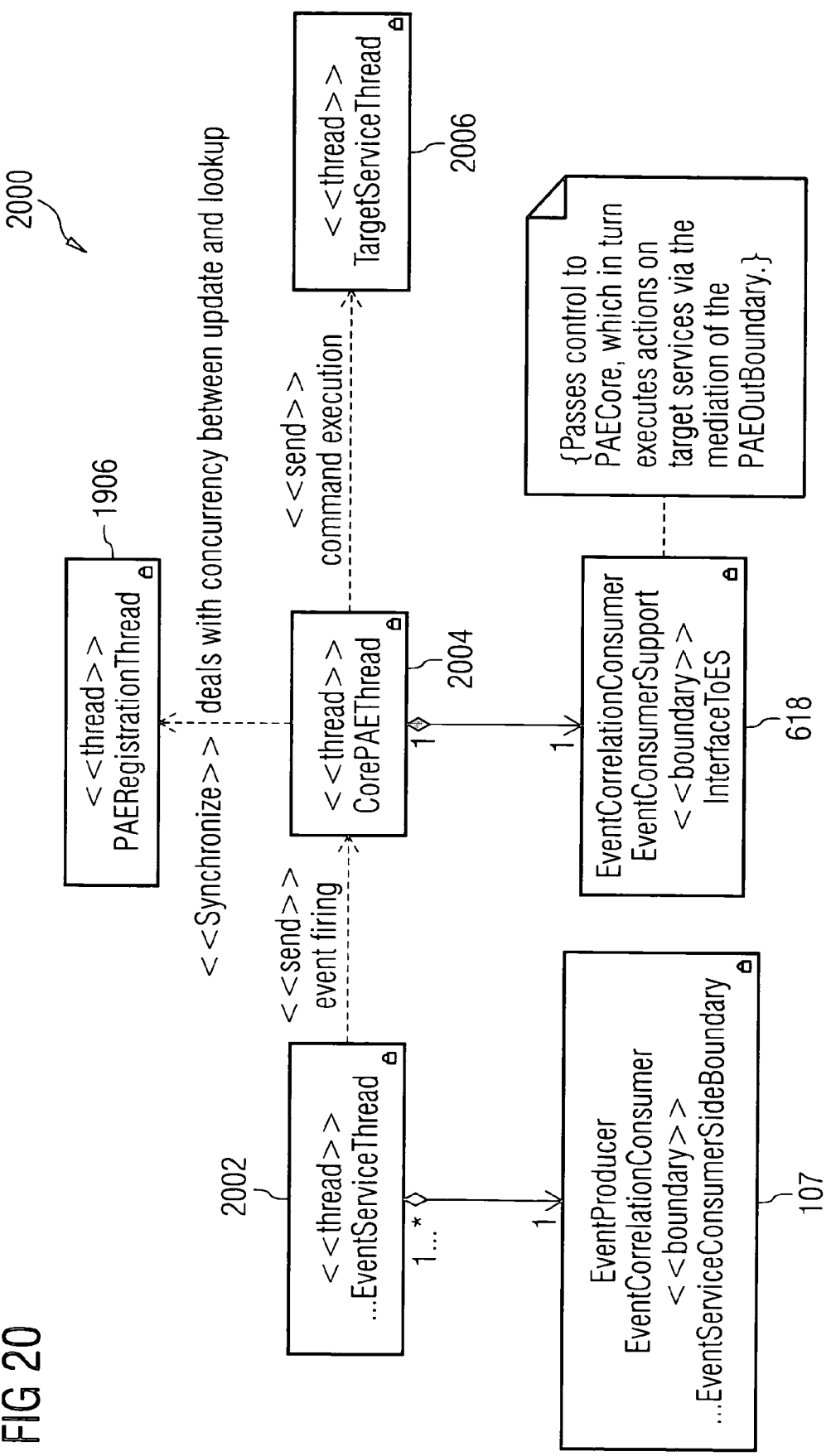
FIG. 20 is a UML class diagram showing the profile activation aspects of one embodiment of this invention in terms of a thread model which illustrates how said embodiment handles event notification messages originating from an event service for automatically activating profiles.

FIGS. 6 to 16 illustrate in detail the PAE Core system architecture by means of UML sequence diagrams. These diagrams are derived by the analysis of the use cases presented in the UML use case diagram shown in FIG. 3 (with the exception of the use cases "manage profile" and "activate profile manually" since these use cases are not essential for understanding the PAE Core 110). A process and thread model is shown in the UML class diagrams depicted in FIGS. 17 to 20. As illustrated in FIG. 19, a General Application 104 requests to the PAE 110' the registration of a Profile 210 via a synchronous interface. Once the PAE 110' has completed its registration duties, it registers a corresponding correlated event specification to the Event Service system 112. Since this registration process might hang up until a set of event producers dealing with the given correlated event specification is available, the PAE 110' uses an asynchronous interface to access the Event Service system 112. The completion of this registration process will be notified via a corresponding event consumer registration confirmation primitive generated by the Event Service system 112 and asynchronously forwarded to the PAE 110'. The PAE 110' hence needs a thread for handling such confirmations, correlating them with the suspended Profile registration and complete the latter.

It should be noted that the term IPC has been used here in a loose sense to denote interthread communication. In fact, this model can easily be extended to distributed-processing architectures, wherein i.e. the Event Service system 112 is located in a different memory space with respect to the PAE 110'. In this case, the stereotype <<thread>> should be substituted by the stereotype <<process>>.

TABLE 1

Definition of the Applied Technical Terms

| Technical Term | Brief Explanation of the Technical Term |
|---|---|
| Ad-hoc Computing | Ad-hoc computing refers to the automatic discovery and dynamic use of computational units and/or general-purpose services advertised in a network to fulfill certain tasks based on predefined settings (typically, user preferences). |
| Ad-hoc Networking | By contrast, ad-hoc networking means the discovery of automatic devices and the establishment of connectivity among nearby devices in an unplanned, unmanaged fashion. Thus, routing of messages can be accomplished on the basis of a multihop technique, in which routing functionality is offered by most (if not even all) of the nodes participating to the ad-hoc network. |
| Ad-hoc Networks | An ad-hoc network can be any network interconnecting a number of mobile terminals which is established by using the ad-hoc networking mechanism as described above. For example, it can be an unmanaged, unplanned network of fixed and/or moving intercommunicating computing devices. |
| Binding | A Binding is a container that combines a Profile with a Triggering Condition - a Boolean expression -, thus specifying the Profile that has to be executed if the given Triggering Condition yields "TRUE". More complex Boolean expressions can be specified by combining a multiplicity of Triggering Conditions at binding level. A Binding can be defined as activated or deactivated: If the Triggering Condition yields the value "TRUE" and the Binding is activated, the bound Profile (in terms of a list of Actions) is executed. An activated Binding indicates that a given (simple or combined) Triggering Condition is armed. A Binding can be created as already activated or deactivated based on an explicit constructor parameter passed by the creator of the Binding (a user or a developer). |
| Context | Context data are any data that can be used for determining the situation of an entity (which can e.g. be a human, a piece of equipment, or a software unit). To this extent, data can directly be used as they are, be associated with other data or manipulated e.g. for extracting statistical information from it for recognizing a pattern from it. |

TABLE 1-continued

Definition of the Applied Technical Terms

| Technical Term | Brief Explanation of the Technical Term |
|---|---|
| Context Awareness | A system is context-aware if it uses context data to provide relevant information and/or services to the user. As described in "Providing Architectural Support for Building Context-Aware Applications" (PhD thesis, College of Computing, Georgia Institute of Technology, Dec. 2000, http://www.cc.gatech.edu/fce/ctk/pubs/dey-thesis.pdf) by A. K. Dey, relevancy depends on the user's task. |
| Profile | A Profile is a given list of Actions, which can also include references of other Profiles. |
| Target Service | A Target Service identifies the General Service that supports the Actions execution upon activation of Profiles. |
| Triggering Condition | A Triggering Condition describes what has to happen for triggering the automatic execution of a Profile. |

TABLE 2

Used Abbreviations

| API | Application Programming Interface |
| CA | Context Awareness |
| CE | Consumer Electronics |
| FCR | Functional Requirement |
| GENA | General Event Notification Architecture |
| IPC | Inter-Process Communication |
| NIE | Network Information Engine |
| PAE | Profile Activation Engine |
| PDA | Personal Digital Assistant |
| RPC | Remote Procedure Call |
| SIP | Session Initiation Protocol |
| SOAP | Simple Object Access Protocol |
| UML | Unified Modeling Language |
| UPnP | Universal Plug and Play |
| WWW | World Wide Web |
| XML | Extended Markup Language |

TABLE 3

Depicted Features and their Corresponding Reference Signs

| No. | Technical Feature (System Component, Procedure Step) |
|---|---|
| 100 | UML object diagram showing the interdependencies between the packages the Profile Activation Engine (PAE) architecture 110' according to the present invention is composed of |
| 100a | UML object diagram showing a more detailed view of the packages the PAE Core 110 is composed of - the Binding Management 109a, the Triggering Condition Monitor 109b, and the Profile Execution Engine 109c - as well as the interdependencies between these packages |
| 102 | public class MetaDataManagement |
| 104 | public class Application:GeneralApplicationClass |
| 106 | public class GeneralService |
| 107 | public class EventCorrelator:EventServiceConsumerSideBoundary |
| 108 | public class BindingCreationEngine |
| 109a | Binding Management of the Profile Activation Engine 110' |
| 109b | Triggering Condition Monitor of the Profile Activation Engine 110' |
| 109c | Profile Execution Engine of the Profile Activation Engine 110' |
| 110 | public class PAECore - the class of the Profile Activation Engine 110' |
| 110' | Profile Activation Engine according to the present invention, in the following also referred to as "middleware entity" of a mobile terminal 504 |
| 110a | "manage profile" use case of the Profile Activation Engine 110' |
| 110b | "activate profile manually" use case of the Profile Activation Engine 110' |
| 110c | "activate profile automatically" use case of the Profile Activation Engine 110' |
| 110d | "Register Profile" use case of the Profile Activation Engine 110' |
| 110e | "DeRegister Profile" use case of the Profile Activation Engine 110' |
| 110f | "Activate Profile" use case of the Profile Activation Engine 110' |
| 110g | "DeActivate Profile" use case of the Profile Activation Engine 110' |
| 112 | public class EventService of the Profile Activation Engine 110' |
| 114 | public class ContextProcessing of the Profile Activation Engine 110' |
| 116 | public class ScriptInterpreter of the Profile Activation Engine 110' |
| 118 | public class RemoteEventProducer of the Profile Activation Engine 110' |
| 120 | public class LoaclEventProducer of the Profile Activation Engine 110' |
| 200 | UML class diagram showing a structural overview of the data model for the PAE concept according to the present invention |
| 202 | public interface BooleanCondition of the Profile Activation Engine 110' |
| 204 | public class TriggeringCondition of the Profile Activation Engine 110' |
| 206 | public class Binding of the Profile Activation Engine 110' |

TABLE 3-continued

Depicted Features and their Corresponding Reference Signs

| No. | Technical Feature (System Component, Procedure Step) |
|---|---|
| 208 | public class Guard of the Profile Activation Engine 110' |
| 210 | public class Profile of the Profile Activation Engine 110' |
| 212 | public class TargetService of the Profile Activation Engine 110' |
| 214 | public class Action of the Profile Activation Engine 110' |
| 216 | public class ProfileItem of the Profile Activation Engine 110' |
| 300 | UML use case diagram illustrating the core PAE concept according to the present invention |
| 400 | program code sequence showing an example for the source code of a binding definition according to one embodiment of the present invention |
| 500 | user scenario wherein the PAE 110' is advantageously used for automatically executing actions of behalf of a user who enters his/her apartment and discovers that local services (e.g. an automatic photo synchronization application which is used for updating a photo database) present in a given mobile ad-hoc network can automatically be executed based on his/her preferences |
| 502a | mobile ad-hoc network, comprising a number of interconnected intermediate nodes whose connectivity is unpredictably time-varying, which is used for wirelessly accessing discovered entities (networks, devices, services) in the environment of a user |
| 502b | wireless communication device (e.g. a PDA), used for discovering networks, devices, services which are accessible via said mobile ad-hoc network 502a |
| 504 | public switched telephone network (PSTN), wirelessly interconnected to said mobile ad-hoc network 502a |
| 600 | UML sequence diagram showing the interactions between a general application class 104, the classes 602 to 618 and a class modeling the service consumer side boundary 106 in case of a successful profile registration |
| 602 | public class PAEInBoundary of the Profile Activation Engine 110' |
| 604 | public class PAERegistrationController of the Profile Activation Engine 110' |
| 616 | public class profileRegistrations of the Profile Activation Engine 110' |
| 618 | public class InterfaceToES of the Profile Activation Engine 110' |
| 700 | UML sequence diagram showing the interactions between a general application class 104 and the classes 602, 604, and 616 in the error case of trying to register a profile for an already registered triggering condition |
| 800 | UML sequence diagram showing the interactions between a general application class 104 and the classes 602, 604, 206, 616, and 618 in case of a successful binding deregistration for the base flow |
| 900 | UML sequence diagram showing the interactions between a general application class 104 and the classes 602, 604, and 616 in the error case of a failed deregistration of a binding for an alternate flow while trying to deregister a not existent binding |
| 1000 | UML sequence diagram showing the interactions between a general application class 104 and the classes 602, 604, 206, and 616 in case of a successful binding activation for the base flow |
| 1100 | UML sequence diagram showing the interactions between a general application class 104 and the classes 602, 604, and 616 in the error case of a failed binding activation for the alternate flow since no such binding is registered |
| 1200 | UML sequence diagram showing the interactions between a general application class 104 and the classes 602, 604, 206, and 616 in the error case of a failed binding activation for the alternate flow since the given binding is already activated |
| 1300 | UML sequence diagram showing the interactions between a general application class 104 and the classes 602, 604, 206, and 616 in case of a successful deactivation of an active binding |
| 1400 | UML sequence diagram showing the interactions between a general application class 104 and the classes 602, 604, and 616 in the error case of a failed deactivation of an active binding for the alternate flow since the given binding has not been registered |
| 1500 | UML sequence diagram showing the interactions between a general application class 104 and the classes 602, 604, 206, and 616 in the error case of a failed deactivation of an active binding for the alternate flow since the given binding was already inactive |
| 1600 | UML sequence diagram showing the interactions between a general application class 104, the classes 206 to 212, 616, 618, 1602, 1604, the PAECore class 110 and a class modeling the service consumer side boundary 106 in case of a successful automatic profile activation for the base flow |
| 1602 | public class Service |
| 1604 | public class PAEOutBoundary of the Profile Activation Engine 110' |
| 1700 | UML class diagram showing the analysis classes of the PAE 110', stereotyped as "boundary" (104, 602, 618, 1604) and "control" classes (110, 604), respectively |
| 1702 | public class EventConsumerSupport of the Profile Activation Engine 110' |
| 1704 | public class EventCorrelationConsumer of the Profile Activation Engine 110' |
| 1706 | public class ProfileRegistrationList of the Profile Activation Engine 110' |
| 1800 | UML class diagram showing the analysis classes of the PAE 110', stereotyped as "entity" classes (204, 206, 208, 210, 212, 214, 216, 1706) |
| 1900 | UML class diagram showing the profile registration aspects of one embodiment of this invention in terms of a thread model which illustrates how said embodiment handles deferred event consumer registration confirmations generated by an event service, that is accessed by means of an asynchronous interface, and correlates them with suspended profile registrations requested to said embodiment via a synchronous interface for completing the latter |
| 1902 | public class GeneralApplicationThread of the Profile Activation Engine 110' |
| 1904 | public class RegistrationThread of the Profile Activation Engine 110' |

TABLE 3-continued

Depicted Features and their Corresponding Reference Signs

| No. | Technical Feature (System Component, Procedure Step) |
|---|---|
| 1906 | public class PAERegistrationThread of the Profile Activation Engine 110' |
| 2000 | UML class diagram showing the profile activation aspects of one embodiment of this invention in terms of a thread model which illustrates how said embodiment handles event notification messages originating from an event service for automatically activating profiles |
| 2002 | public class EventServiceThread of the Profile Activation Engine 110' |
| 2004 | public class CorePAEThread of the Profile Activation Engine 110' |
| 2006 | public class TargetServiceThread of the Profile Activation Engine 110' |
| 2100 | table listing the only method of the public interface BooleanCondition 202, which is needed within the SystemArchitecture.Middleware.ProfileActivationEngine package |
| 2200 | table listing the methods of the public class InterfaceToES 618, which is needed within the SystemArchitecture.Middleware.ProfileActivationEngine package |
| 2300 | table listing the methods of the public class PAEInBoundary 602, which is needed within the SystemArchitecture.Middleware.ProfileActivationEngine package |
| 2400 | table listing the only method of the public class PAEOutBoundary 1604, which is needed within the SystemArchitecture.Middleware.ProfileActivationEngine package |
| 2500 | table listing the only method of the public class PAECore 110, which is needed within the SystemArchitecture.Middleware.ProfileActivationEngine package |
| 2600 | table listing the methods of the public class PAERegistrationController 604, which is needed within the SystemArchitecture.Middleware.ProfileActivationEngine package |
| 2700 | table listing the methods of the public class TargetService 212, which is needed within the SystemArchitecture.Middleware.ProfileActivationEngine package |
| 2800 | table listing the methods of the public class ProfileRegistrationList 1706, which is needed within the SystemArchitecture.Middleware.ProfileActivationEngine package |
| 2900 | table listing the only method of the public class ProfileItem 216, which is needed within the SystemArchitecture.Middleware.ProfileActivationEngine package |
| 3000 | table listing the methods of the public class Profile 210, which is needed within the SystemArchitecture.Middleware.ProfileActivationEngine package |
| 3100 | table listing the only method of the public class Guard 208, which is needed within the SystemArchitecture.Middleware.ProfileActivationEngine package |
| 3200 | table listing the methods of the public class TriggeringCondition 204, which is needed within the SystemArchitecture.Middleware.ProfileActivationEngine package |
| 3300 | table listing the methods of the public class Action 214, which is needed within the SystemArchitecture.Middleware.ProfileActivationEngine package |
| 3400 | table listing the methods of the public class Binding 206, which is needed within the SystemArchitecture.Middleware.ProfileActivationEngine package |
| 3500 | table listing the methods of the public class TargetServiceThread 2006, needed within the SystemArchitecture.Middleware.ProfileActivationEngine package |
| 3600 | table listing the methods of the public class CorePAEThread 2004, needed within the SystemArchitecture.Middleware.ProfileActivationEngine package |
| 3700 | table listing the methods of the public class GeneralApplicationThread 1902, needed within the SystemArchitecture.Middleware.ProfileActivationEngine package |
| 3800 | table listing the methods of the public class PAERegistrationThread 1906, needed within the SystemArchitecture.Middleware.ProfileActivationEngine package |
| S0a | step #0a: discovering services offered in the wireless ad-hoc network 502a |
| S0b | step #0b: executing a user-defined set of actions 214 collected in a profile 210 upon reception of event notification messages indicating the availability of specific services hosted on a mobile terminal 504 or other mobile terminals interconnected via said wireless ad-hoc network 502a whenever a number of predefined triggering conditions 204 for triggering the execution of an action 214 that is used to request, activate, control and/or deactivate these services is met |
| S1 | step #1: creating bindings 206 between triggering conditions 204 and profiles 210 by assisting users to select triggering conditions 204, select and/or create profiles 210 and associate each triggering condition 204 with at least one action 214 from a selected or created profile 210 |
| S2 | step #2: handling said actions 214 upon reception of event notification messages indicating any met triggering conditions 204 and allowing (S2a'') applications to directly install said bindings 206 by using a specified application programming interface (API) |
| S2a | step #2a: managing the activation of a binding 206, in particular for an association of a given profile 210 with given triggering conditions 204, by leveraging (S2a') the services of said binding creation means 108 or by allowing (S2a'') applications to directly install said bindings 206 by using a specified application programming interface (API) |
| S2b | step #2b: monitoring the occurrence of triggering conditions which belong to active bindings 206 |
| S2c | step #2c: evaluating guard conditions for fine-grained control |
| S2d | step #2d: executing said actions 214 upon reception of event notification messages indicating any met triggering conditions 204 |
| S3 | step #3: evaluating complex triggering conditions 204 modeled as a set of correlated events whose notifications the middleware entity 110' registers for |
| S4a | step #4a: detecting events concerning the discovery of said services and other terminals within a specified radius around the mobile terminal 504 hosting the middleware entity 110' |
| S4b | step #4b: detecting events concerning the discovery of users participating in communication via said a mobile ad-hoc network 502a within said radius around said mobile terminal 504 |

TABLE 3-continued

Depicted Features and their Corresponding Reference Signs

| No. | Technical Feature (System Component, Procedure Step) |
|---|---|
| S5a | step #5a: delegating any eventual remote procedure call (RPC) to an external processing unit 116 that is capable of interpreting a scripting language of choice, which abstracts out the notion of said RPC to end users |
| S5b | step #5b: delegating complex profile specifications to said processing unit 116, thus allowing (S5b') said middleware entity 110' to use a simple profile specification language which is transparent of the respectively applied RPC protocol |
| S6a | step #6a: allowing event consumers to register for classes of events or specific events generated by specific event producers |
| S6b | step #6b: allowing event consumers to register for complex classes of events by correlating (S6b1) events generated by at least one event producer and monitoring (S6b2) the occurrence of correlated events |
| S6c | step #6c: preprocessing event notification messages indicating the availability of specific services and terminals by allowing event consumers to specify at registration time which services are of interest to them |
| S6d | step #6d: forwarding these event notification messages only to registered event consumers who are interested in at least one class of events and/or event notification messages generated by specific event producers |
| S6e | step #6e: accessing user-defined sets of actions 214 from a distributed database that holds a multiplicity of profiles 210 containing actions for requesting, activating, controlling and deactivating said services, respectively |
| S6f | step #6f: executing these actions 214 |
| S7a | step #7a: coupling new associations between triggering conditions 204 and specified profiles 210 by activating (S7a') said bindings 206 |
| S7b | step #7b: decoupling installed associations between triggering conditions 204 and specified profiles 210 by deactivating (S7b') said bindings 206 |
| S8 | step #8: reusing recursively specified profiles 210 and triggering conditions 204 by activating (S8') installed bindings 206 between said profiles 210 and said triggering conditions 204 |
| S9 | step #9: applying profiles 210 specified on user level and profiles 210 specified on service provider level to address different expertise levels of users such that non-expert users do not need to know the exact sequence of actions 214 that have to be taken upon the occurrence of a certain event in order to achieve a desired effect |
| S10a | step #10a: statically retrieving information about interface definitions of remote devices offering said services and profiles 210 specified on service provider level from a local or remote persistent profile library whose updates can be downloaded from a web server |
| S10b | step #10b: dynamically retrieving proactively disseminated information about interface definitions of remote devices offering said services and profiles 210 specified on service provider level via the Service Discovery Protocol SDP |
| S10c | step #10c: dynamically retrieving information about interface definitions of remote devices offering said services and profiles 210 specified on service provider level by querying (S10c') these services as soon as they have been discovered - on the assumption that these services publish such information as a specific attribute |
| S10d | step #10d: dynamically retrieving information about interface definitions of remote devices offering said services and profiles 210 specified on service provider level by querying (S10d') a proxy entity which supports services that run on devices with limited capabilities concerning memory and/or the enforcement of legacy interfaces |

The invention claimed is:

1. A terminal connectable to a network, said terminal being adapted to support at least one of an application and a middleware entity to automatically discover services offered by said network, at least one of network topology changes and users' presence in order to execute a user-defined set of actions upon reception of event notification messages indicating an availability of specific services hosted on said terminal, a presence of other terminals interconnected via said network or a presence of a user operating one of said terminals whenever a number of predefined triggering conditions for triggering an execution of an action that is used to control the services is met, wherein said terminal includes the middleware entity having
means for creating bindings between triggering conditions and profiles by assisting users to select triggering conditions, select or create profiles, and associate each triggering condition with at least one action from a selected or created profile,
a core processing unit configured to manage an activation of a binding for an association of a given profile with given triggering conditions, by leveraging services of said means for creating bindings or by allowing applications to directly install said bindings by using a specified application programming interface (API), to monitor an occurrence of triggering conditions belonging to active bindings, to evaluate guard conditions for fine-grained control, wherein guard variables monitor properties of the terminal, and to execute said actions depending on the corresponding guard variables upon reception of event notification messages indicating any met triggering conditions,
an Event Service system for registering a user for at least one of classes of events and specific events generated by specific event producers, for registering a user for complex classes of events by correlating events generated by at least one event producers and monitoring an occurrence of correlated events, for pre-processing event notification messages indicating an availability of specific services, and for forwarding said event notification messages only to registered users interested in at least one of said classes of events and said event notification messages generated by said specific event producers, and
a unit configured to access said user-defined sets of actions from a distributed database including a multiplicity of profiles containing actions for requesting, activating, controlling and deactivating said services, respectively, and to execute said user-defined sets of actions.

2. A terminal according to claim 1, wherein the Event Service system supports the middleware entity evaluating complex triggering conditions modeled as individual or correlated events, notifications of which the middleware entity computes and registers with said Event Service system, said event notification messages are either one of locally generated or remotely generated.

3. A terminal according to claim 1, wherein a Network Information Engine (NIE) detects events concerning a detection of either one of said services and other terminals within a specified radius around the terminal hosting the middleware entity.

4. A terminal according to claim 1, wherein a Person Identification Unit (PIU) detects events concerning a detection of users participating in communication via said network within said radius around said terminal.

5. A terminal according to claim 1, wherein a dynamically configurable context processing system with an integrated module is configured to correlate events generated by at least one event producer, which is applied on incoming event notification messages to enhance and/or refine data being delivered to the core processing unit.

6. A terminal according to claim 1, wherein a dynamically configurable context processing system with an integrated module is configured to correlate events generated by at least one event producer applied to context data in order to provide further information to compute triggering conditions.

7. A terminal according to claim 1, wherein an external processing unit is configured to interpret a scripting language for delegating complex profile specifications to said processing unit in order to allow said middleware entity using a simple profile specification language.

8. A terminal according to claim 7, wherein said external processing unit includes an internal application programming interface for realizing a remote procedure call (RPC) towards a remote target service transparent to the user and agnostic of an actual pluggable RPC protocol used by abstracting out a syntax required by the applied RPC protocol.

9. A method for supporting at least one of an application and a middleware entity to automatically detect services offered by nodes of an ad-hoc network, at least one of network topology changes and users' presence in order to execute a user-defined set of actions collected in a profile upon reception of event notification messages indicating an availability of specific services hosted at least on a mobile terminal and other mobile terminals interconnected via said ad-hoc network whenever a number of predefined triggering conditions for triggering an execution of an action that is used to at least one of the plurality of request, activate, control and deactivate the services is met on behalf of said applications or said middleware entity, said method comprising:
creating bindings between triggering conditions and profiles by assisting users to select triggering conditions, select or create profiles and associate each selected triggering condition with at least one action from a selected or created profile;
managing an activation of a binding for an association of a given profile with given triggering conditions, by leveraging services of said creating bindings or by allowing applications to directly install said bindings by using a specified application programming interface (API);
monitoring an occurrence of triggering conditions which belong to active bindings;
evaluating guard conditions for fine-grained control, wherein guard variables monitor properties of the terminal;
upon reception of event notification messages indicating any met triggering conditions, executing said action depending on the corresponding guard variables;
allowing a registration process for classes of events and specific events generated by specific event producers;
allowing a registration process for complex classes of events by correlating events generated by at least one event producer and monitoring an occurrence of correlated events;
pre-processing event notification messages indicating an availability of specific services;
forwarding the event notification messages only to registered users interested in at least one of said classes of events and said event notification messages generated by said specific event producers;
accessing user-defined sets of actions from a distributed database including a multiplicity of profiles containing actions for requesting, activating, controlling and deactivating said services, respectively; and
executing said user-defined sets of actions.

10. A method according to claim 9, further comprising:
coupling new associations between triggering conditions and specified profiles by activating said bindings.

11. A method according to claim 9, further comprising:
decoupling installed associations between triggering conditions and specified profiles by deactivating said bindings.

12. A method according to claims 10, or 11, further comprising:
reusing recursively specified profiles and triggering conditions by activating installed bindings between said profiles and said triggering conditions.

13. A method according to claims 10, or 11, further comprising:
applying profiles specified on user level and profiles specified on service provider level to address different expertise levels of users such that non-expert users do not need to know an exact sequence of actions that have to be taken upon an occurrence of a certain event in order to achieve a desired effect.

14. A method according to claims 10, or 11, further comprising:
statically retrieving information including interface definitions of remote devices offering said services and profiles specified on service provider level from a local or remote persistent profile library, updates of which can be downloaded from a server connected to said network.

15. A method according to claims 10, or 11, further comprising:
dynamically retrieving proactively disseminated information including interface definitions of remote devices offering said services and profiles specified on service provider level via a Service Discovery Protocol (SDP).

16. A method according to claims 10, or 11, further comprising:
dynamically retrieving information including interface definitions of remote devices offering said services and profiles specified on service provider level by querying the services as soon as they have been detected on an assumption that the services publish such information as a specific attribute.

17. A method according claims 10, or 11, further comprising:
dynamically retrieving information including interface definitions of remote devices offering said services and profiles specified on service provider level by querying a proxy entity which supports services that run on devices with limited capabilities concerning either memory and an enforcement of legacy interfaces.

18. A method according to claims 10, or 11, further comprising:

delegating complex profile specifications to an external processing unit configured to interpret a specific scripting language of choice by realizing a remote procedure call (RPC), such that a simple profile specification language is transparent of an applied RPC protocol.

19. A computer readable storage medium encoded with a computer readable program configured to cause an information processing apparatus to execute a method according to claim 9 when run on a mobile computing device.

* * * * *